United States Patent [19]

Winget

[11] Patent Number: 5,113,490
[45] Date of Patent: May 12, 1992

[54] METHOD FOR FORMING A COMPUTER MODEL FROM AN INTERSECTION OF A CUTTING SURFACE WITH A BOUNDED VOLUME

[75] Inventor: James M. Winget, Mountain View, Calif.

[73] Assignee: Silicon Graphics, Inc., Mountain View, Calif.

[21] Appl. No.: 369,063

[22] Filed: Jun. 19, 1989

[51] Int. Cl.$^5$ ............................................. G06F 5/72
[52] U.S. Cl. ....................................... 395/119; 395/134
[58] Field of Search ........................... 364/522; 340/729

[56] References Cited

U.S. PATENT DOCUMENTS

| | | | |
|---|---|---|---|
| 3,639,736 | 2/1972 | Sutherland | 364/723 |
| 3,684,876 | 8/1972 | Sutherland | 364/700 |
| 3,763,365 | 10/1973 | Seitz | 364/754 |
| 3,816,726 | 6/1974 | Sutherland et al. | 382/41 |
| 3,889,107 | 6/1975 | Sutherland | 382/41 |
| 4,208,810 | 6/1980 | Rohner et al. | 434/43 |
| 4,608,653 | 8/1986 | Setoguchi | 364/522 |
| 4,609,993 | 9/1986 | Shimizu | 364/522 |
| 4,625,289 | 11/1986 | Rockwood | 364/522 |
| 4,674,046 | 6/1987 | Ozeki et al. | 364/413.18 |
| 4,694,404 | 9/1987 | Meagher | 364/518 |
| 4,710,876 | 12/1987 | Cline et al. | 364/413.22 |
| 4,719,585 | 1/1988 | Cline et al. | 364/518 |
| 4,729,098 | 3/1988 | Cline et al. | 364/413.18 |
| 4,821,210 | 4/1989 | Rumbaugh | 364/522 X |
| 4,958,305 | 9/1990 | Piazza | 364/522 |

OTHER PUBLICATIONS

R. Sproull and I. Sutherland, *A Clipping Divider*, AFIPS Conference Proceeding, vol. 33, part, 1, 1968 Fall Joint Computer Conference, pp. 765–775 (Dec. 9, 1968).
W. Lorenson and H. Cline, *Marching Cubes: A High Resolution 3D Surface Construction Algorithm*, Computer Graphics, vol. 21, No. 4, pp. 163–169 (Jul. 1987).

*Primary Examiner*—Gary V. Harkcom
*Assistant Examiner*—Mark K. Zimmerman
*Attorney, Agent, or Firm*—Blakely, Sokoloff, Taylor & Zafman

[57] ABSTRACT

A method for forming a computer model of a modified bounded volume representing a portion of a bounded volume on a cutting surface and to a first side of the cutting surface. After signed distances are calculated, either (1) the first face is modified by deleting the first edge from the first face of the bounded volume, (2) the first edge on the first face is retained, or (3) the first edge of the first face is modified by interpolation. The above steps are repeated for each of the remaining edges of the bounded volume. If the first face has been modified and is missing an edge, then (1) a first cut-face edge is generated for the first face, (2) the first cut face is stored, and (3) the first face is modified by adding the first cut-face edge to the first face. If the first face has been modified, then the first face is stored as modified. Otherwise, the unmodified face is stored. The above steps following the generation of the list of edges is repeated for each of the remaining faces of the bounded volume. A cut face is formed for the stored cut-face edges. The cut face is added to the stored faces of the bounded volume to form the modified bounded volume.

29 Claims, 15 Drawing Sheets

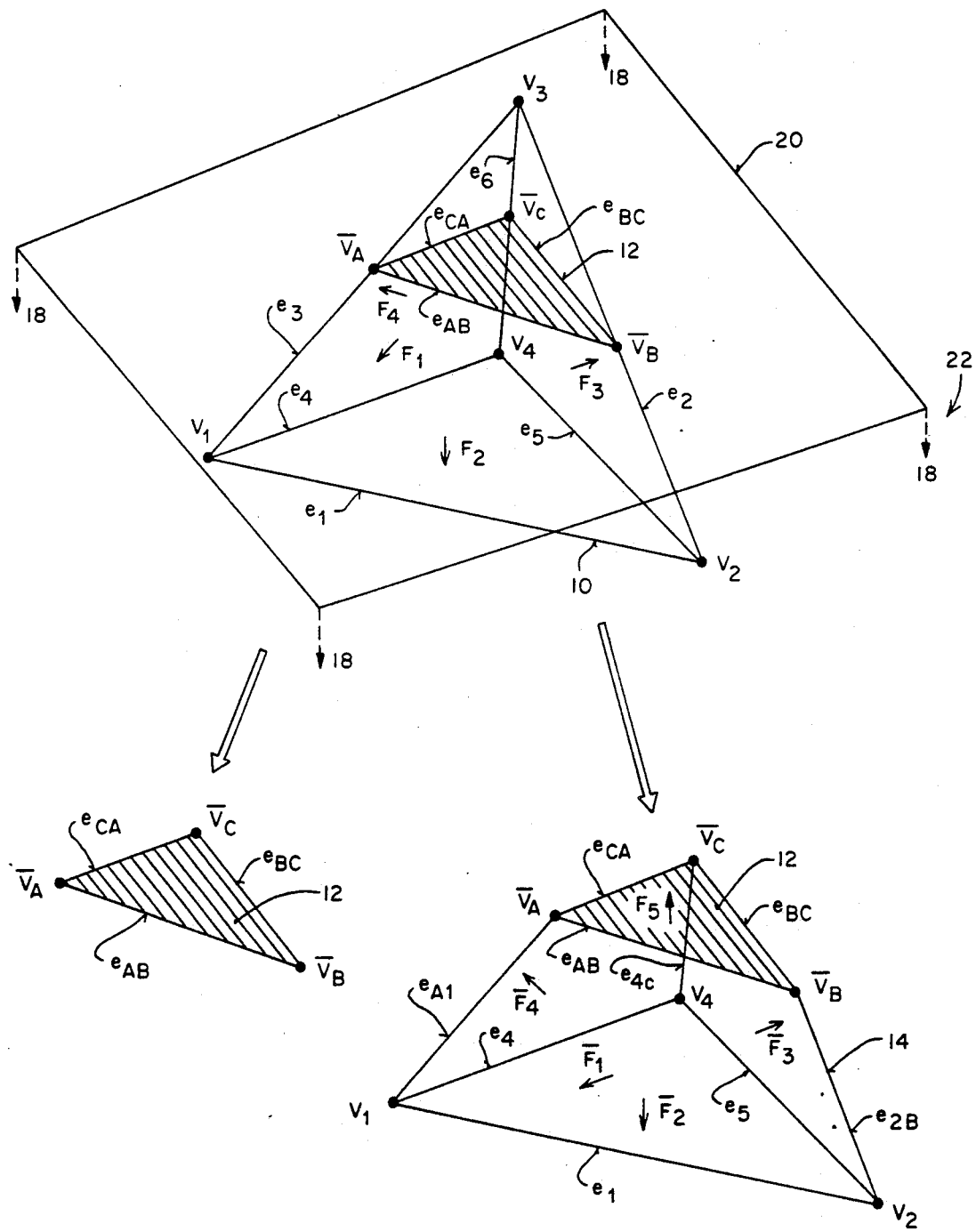
FIG—1

FIG_2
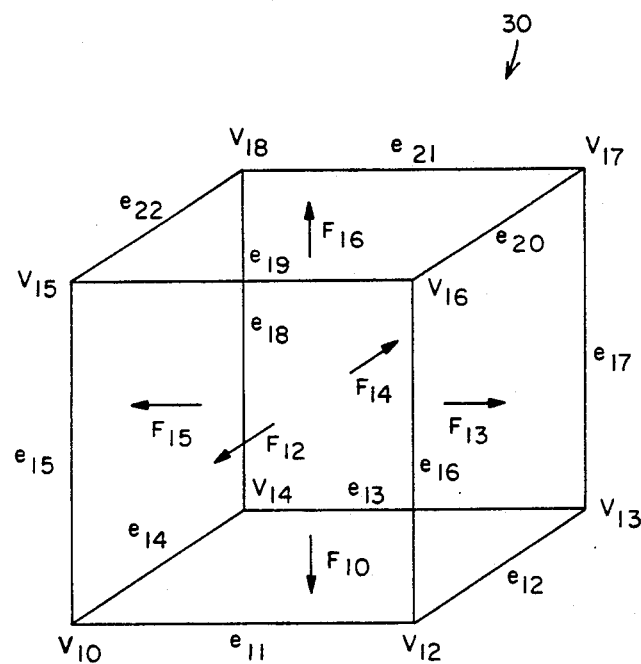
FIG_3
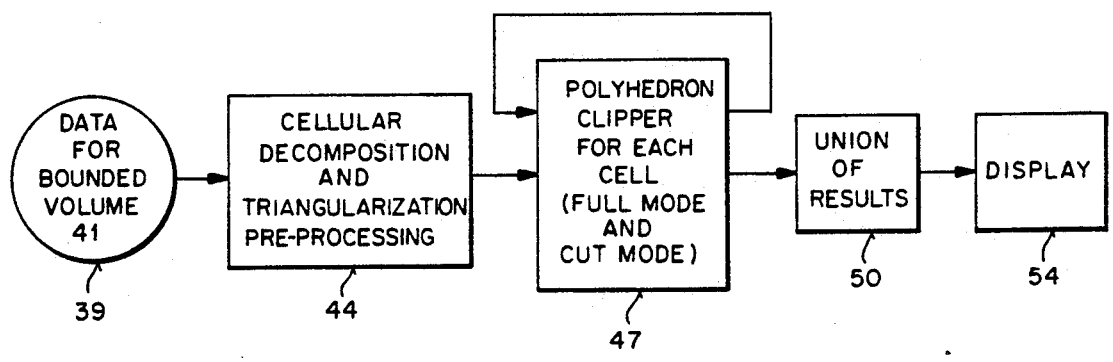

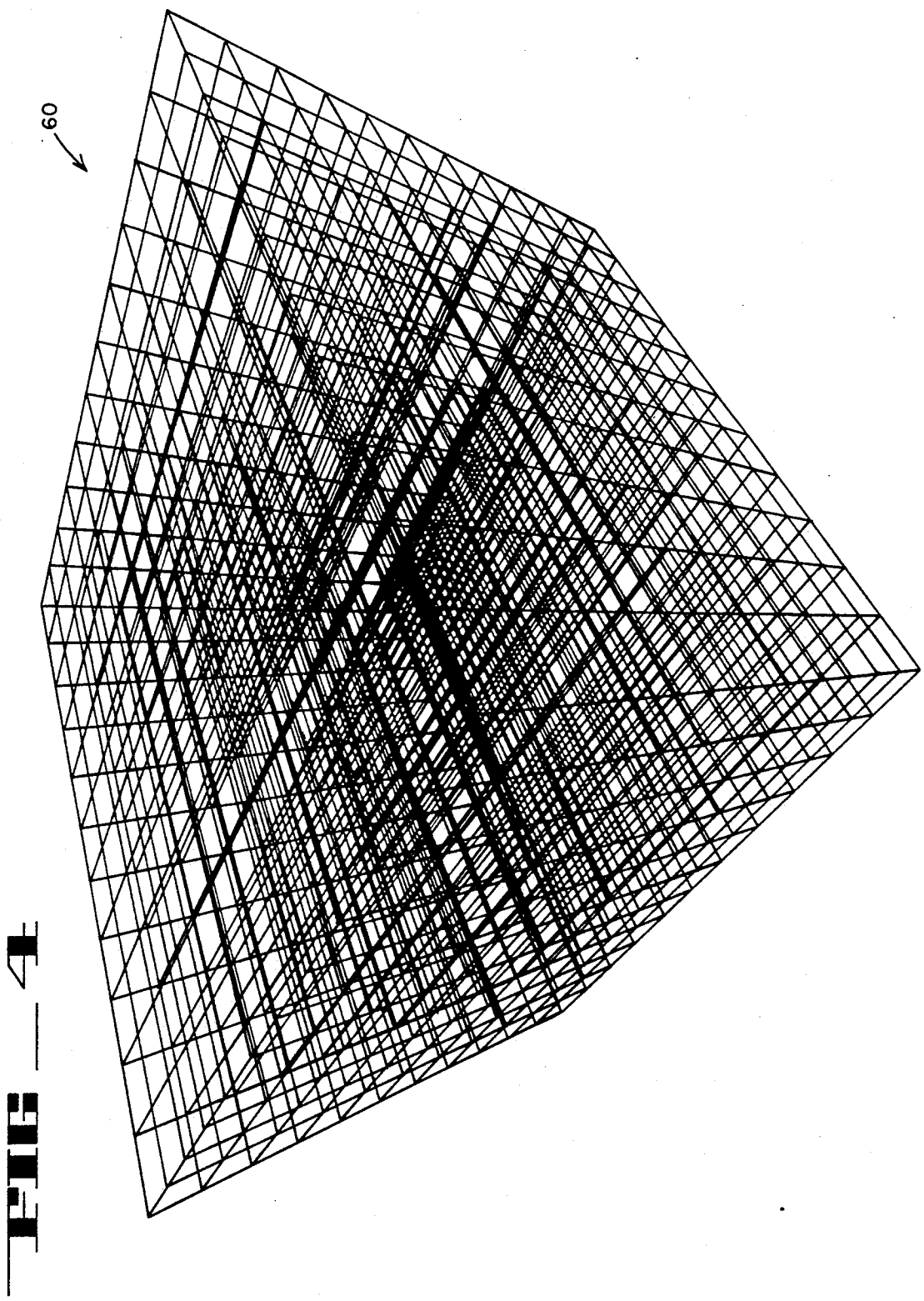
FIG_4

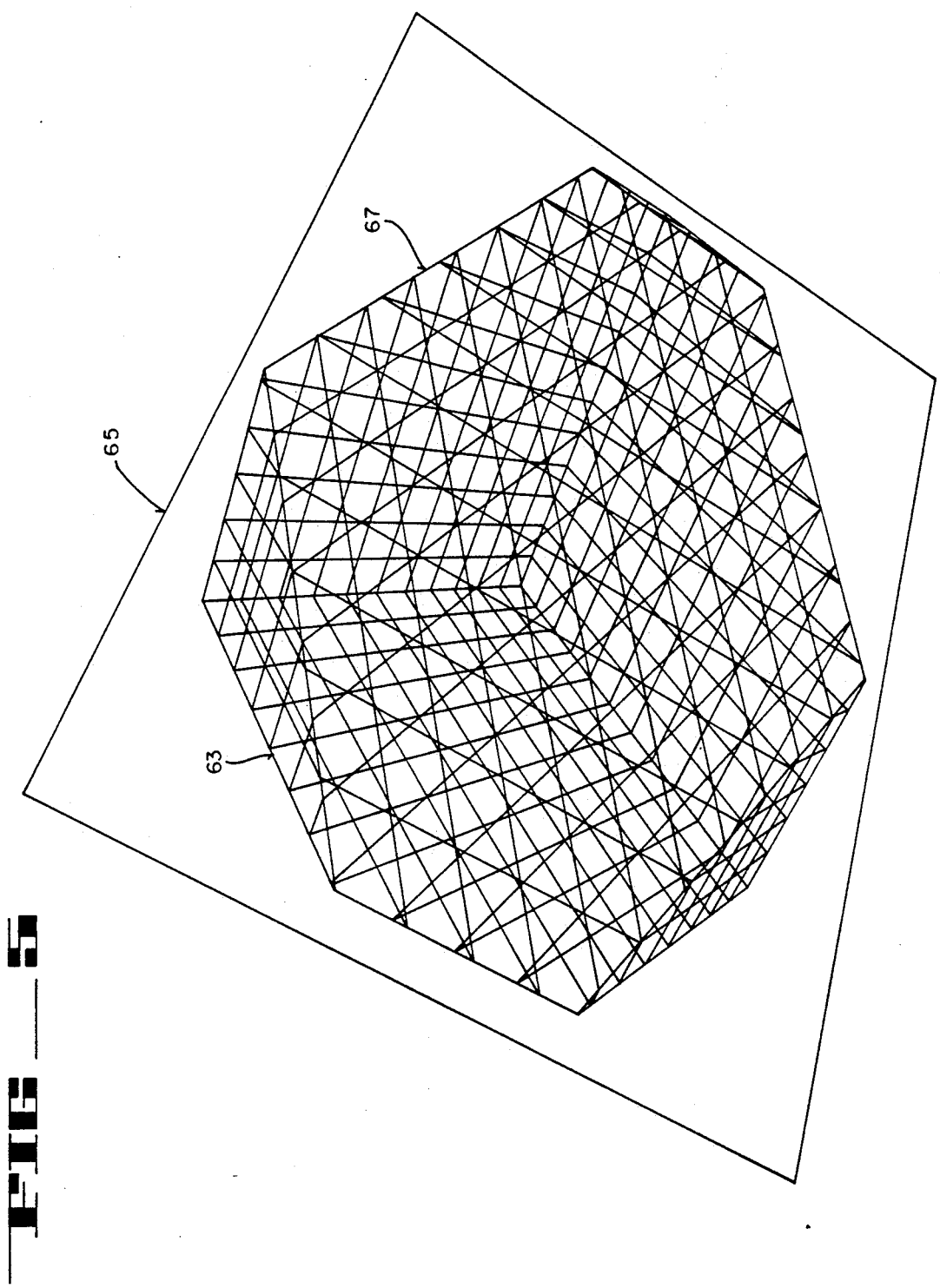
FIG—5

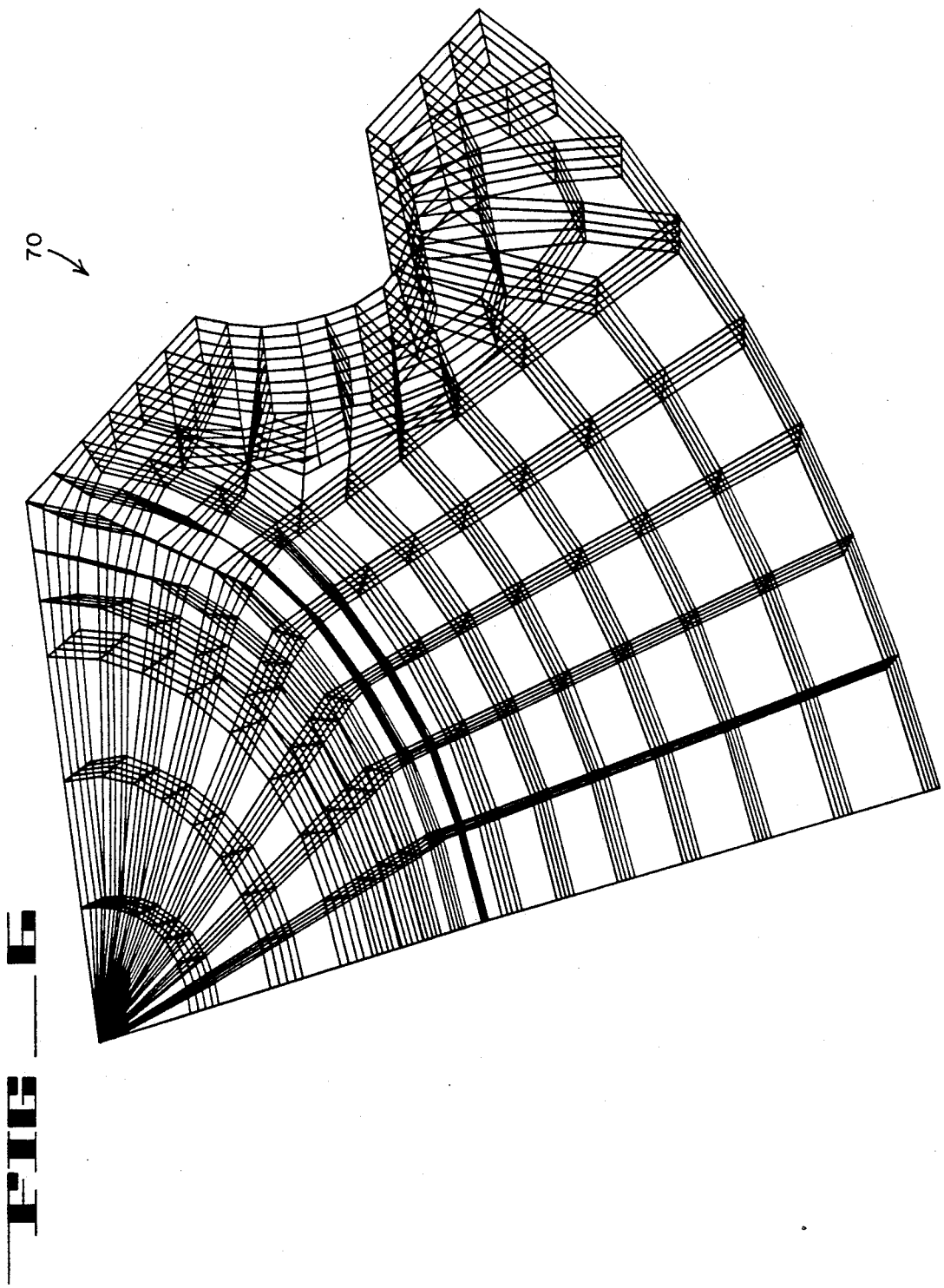
FIG_6

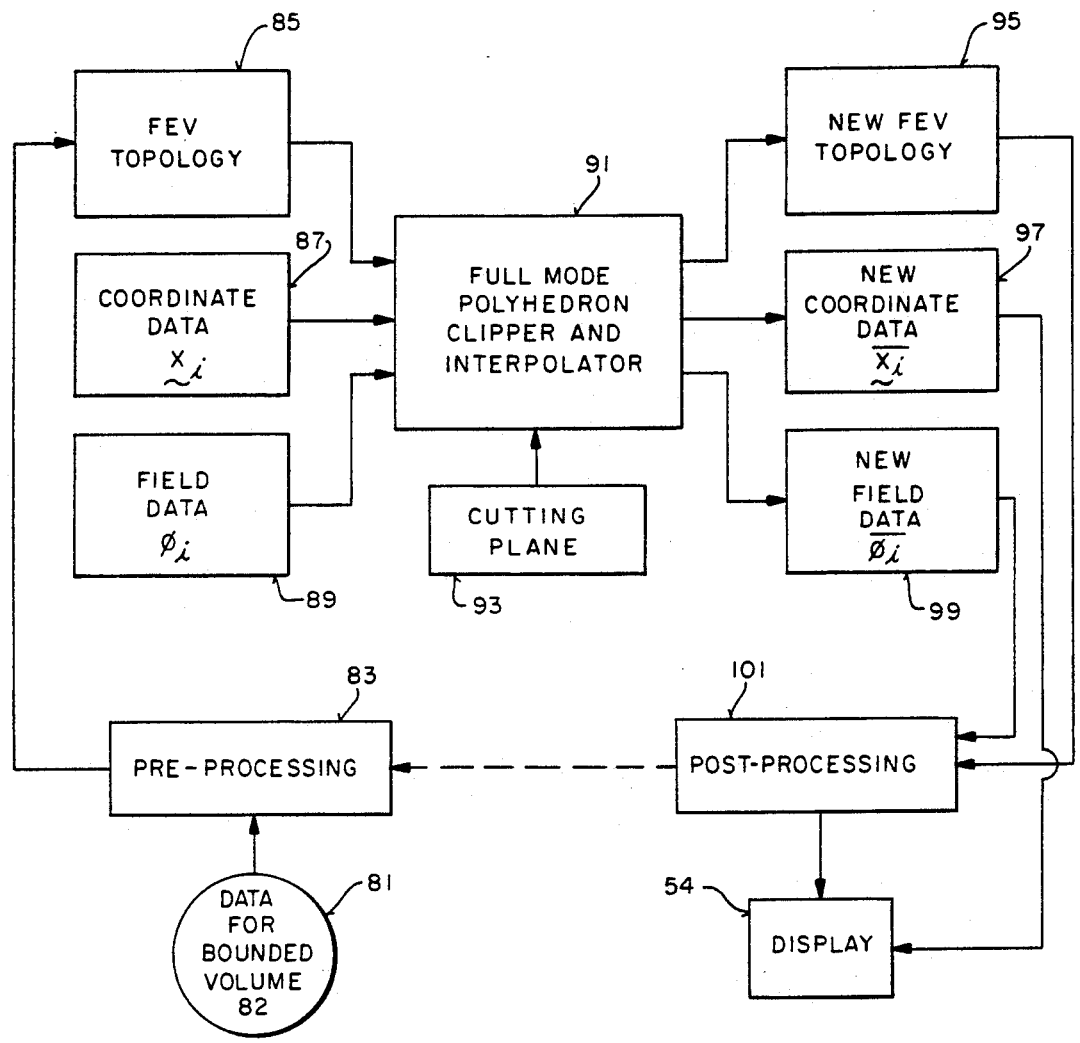
FIG_8
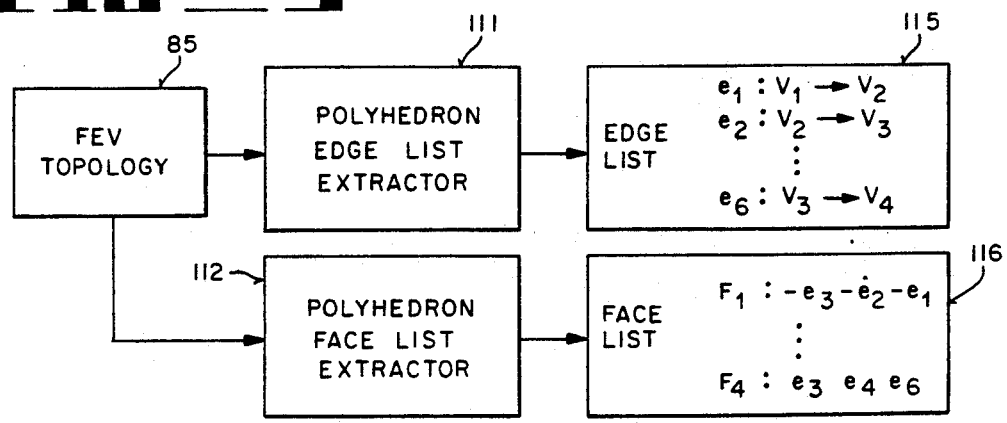
FIG_9

FIG _ 10
| A | | B | C | D |
|---|---|---|---|---|
| FACES : EDGES | | VERTICLES | EDGES: VERTICLES | FACES |
| $F_1$ : $-e_3 -e_2 -e_1$ | | $-(3,2,1)$ | $e_1$ : $V_1\ V_2$ | $F_1$ , $F_2$ |
| $F_2$ : $e_1\ e_4\ e_5$ | | $1,4,5$ | $e_2$ : $V_2\ V_3$ | $F_1$ , $F_3$ |
| $F_3$ : $e_2\ e_6\ e_5$ | | $2,6,5$ | $e_3$ : $V_3\ V_1$ | $F_1$ , $F_4$ |
| $F_4$ : $e_3\ e_4\ e_6$ | | $3,4,6$ | $e_4$ : $V_1\ V_4$ | $F_4$ , $F_2$ |
| | | | $e_5$ : $V_2\ V_4$ | $F_2$ , $F_3$ |
| | | | $e_6$ : $V_3\ V_4$ | $F_3$ , $F_4$ |
FIG _ 11
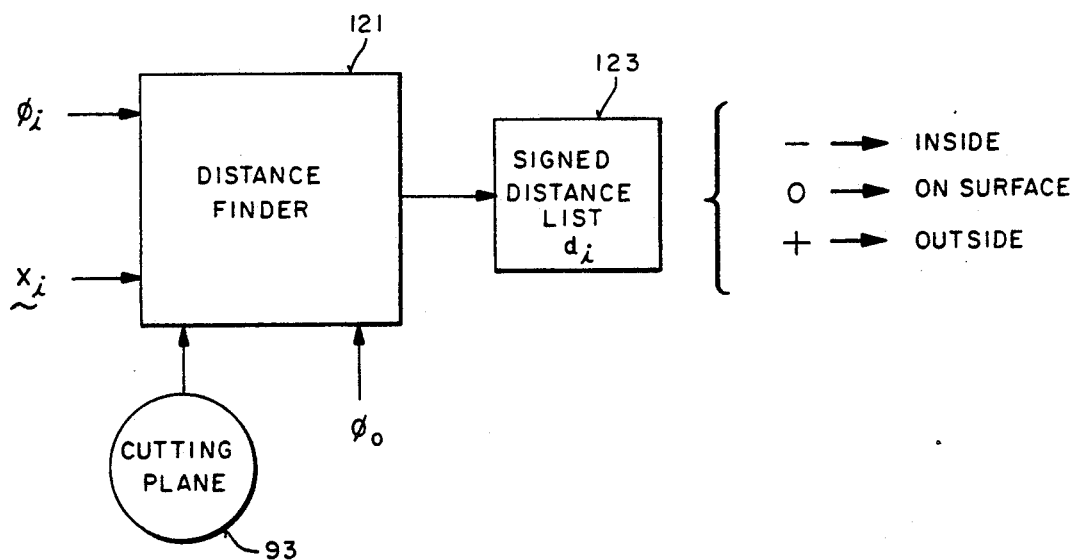

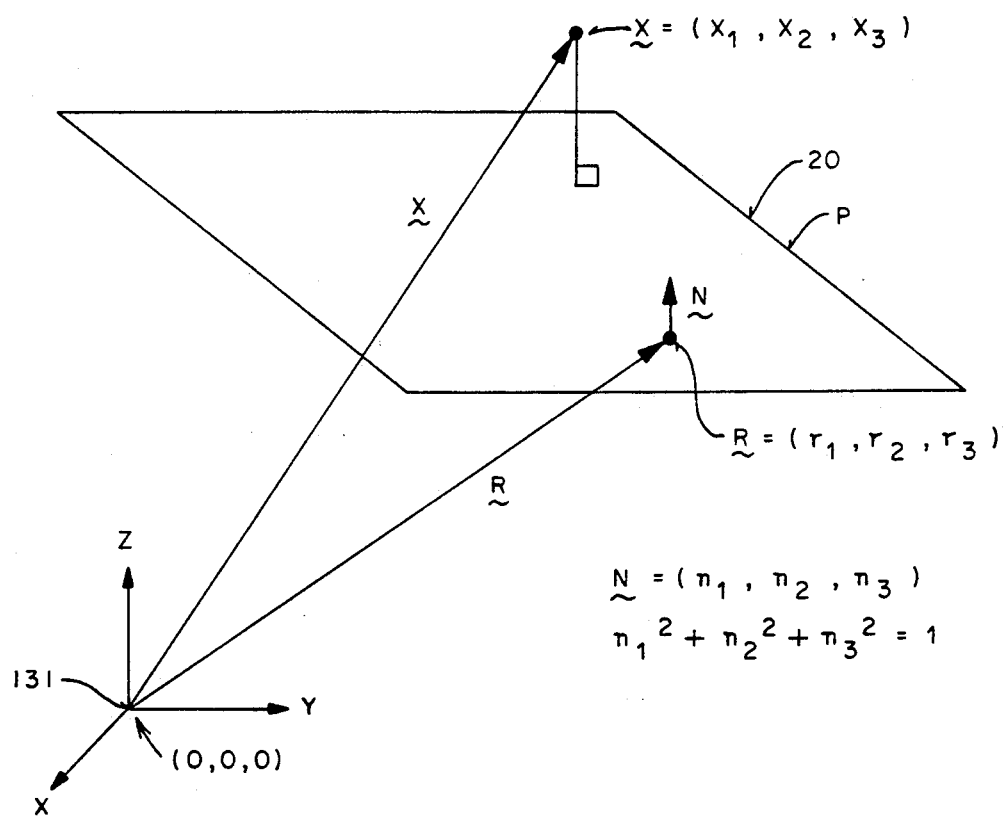
FIG_12

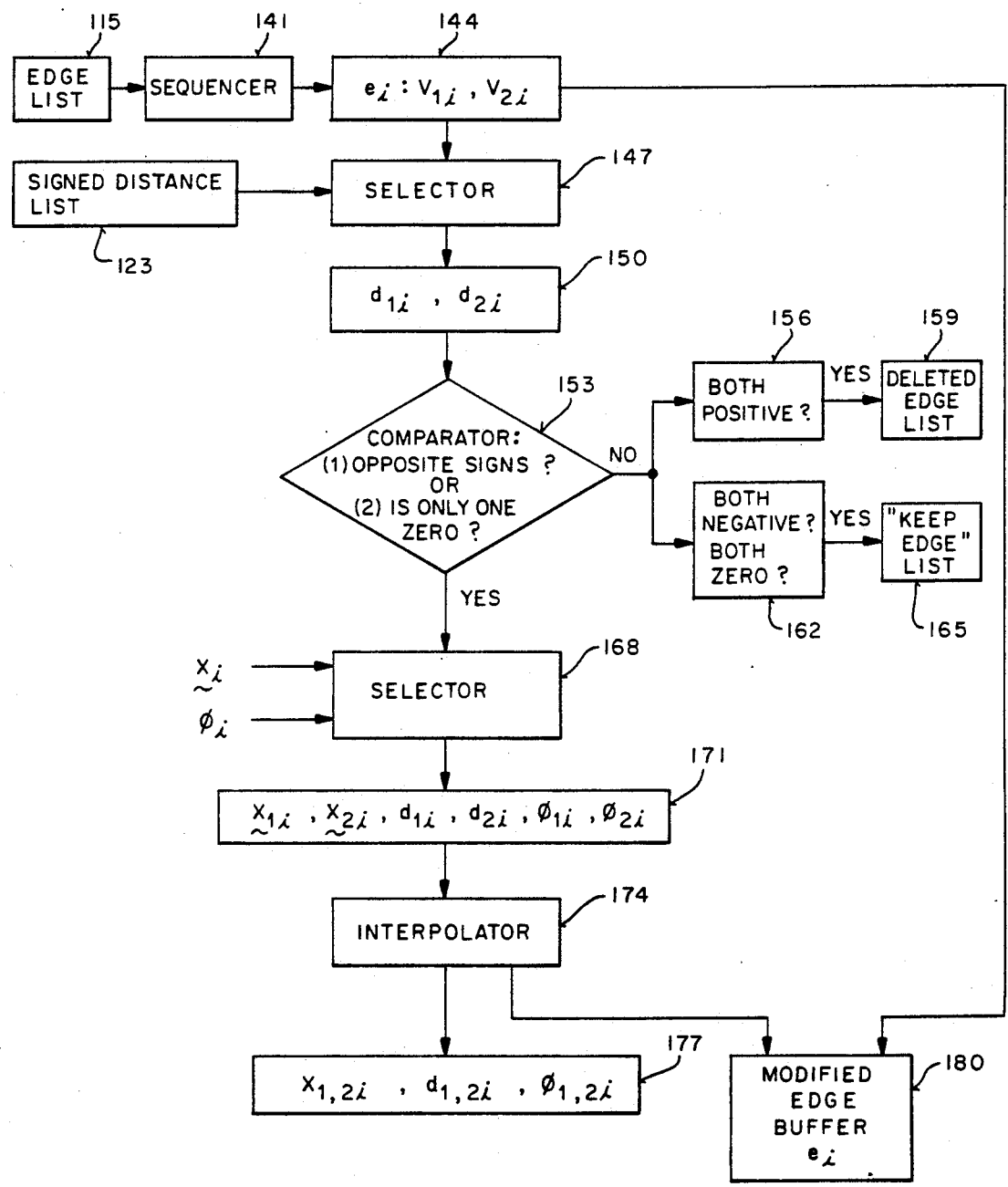

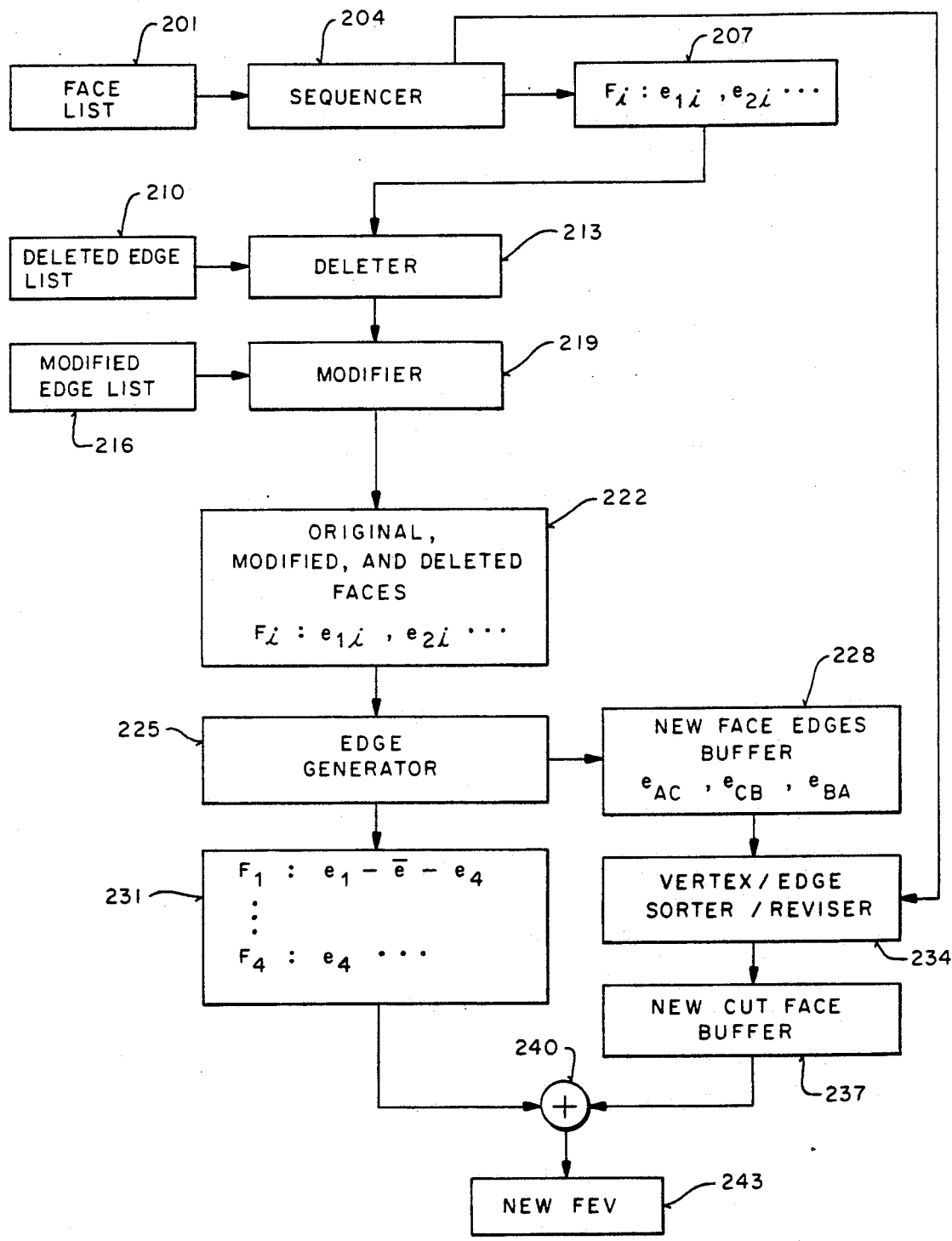

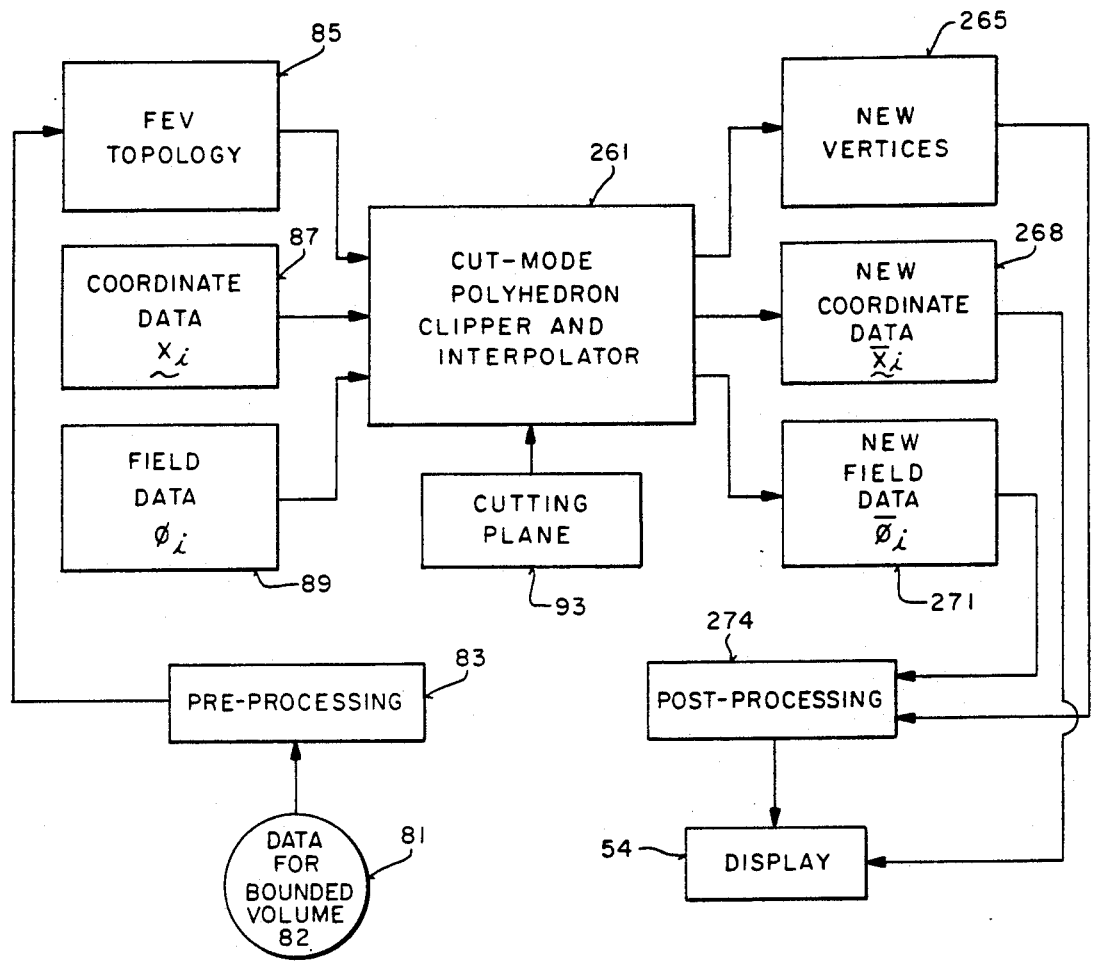
FIG_14
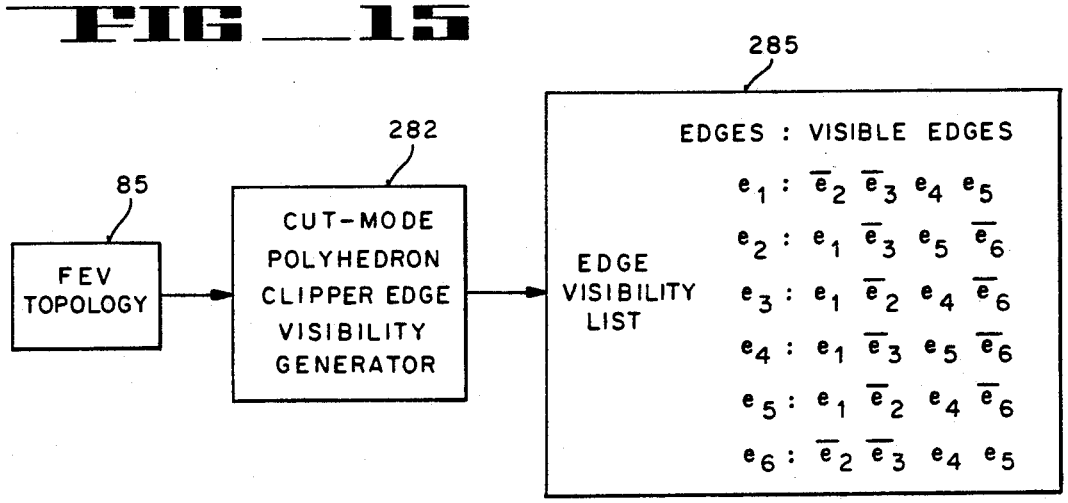
FIG_15

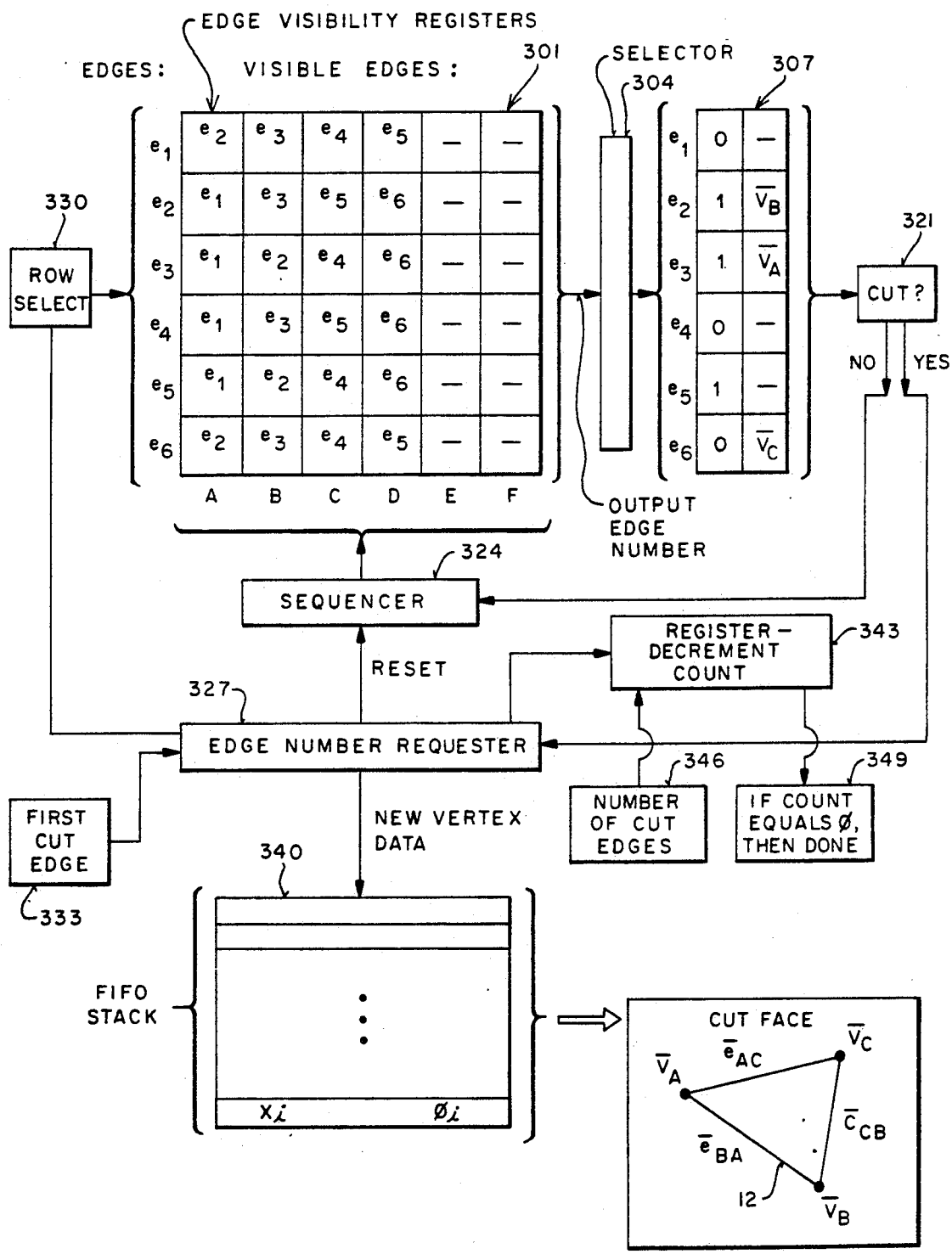
FIG_16

FIG_17
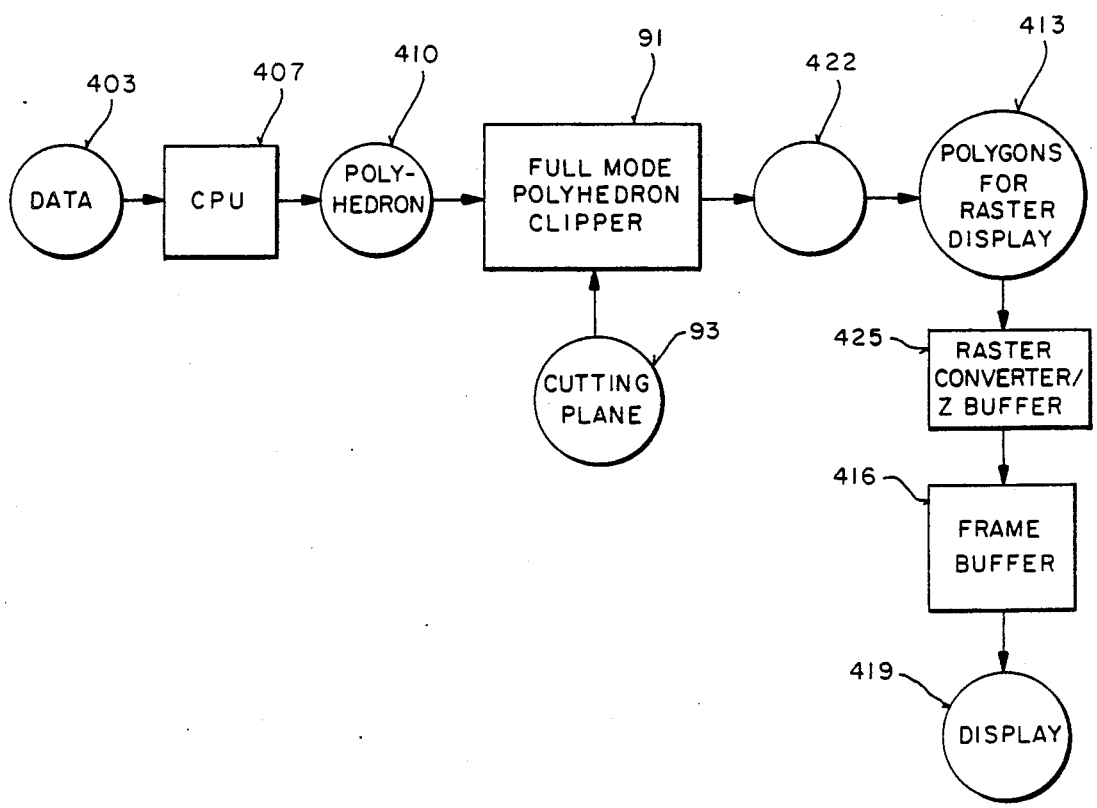
FIG_18
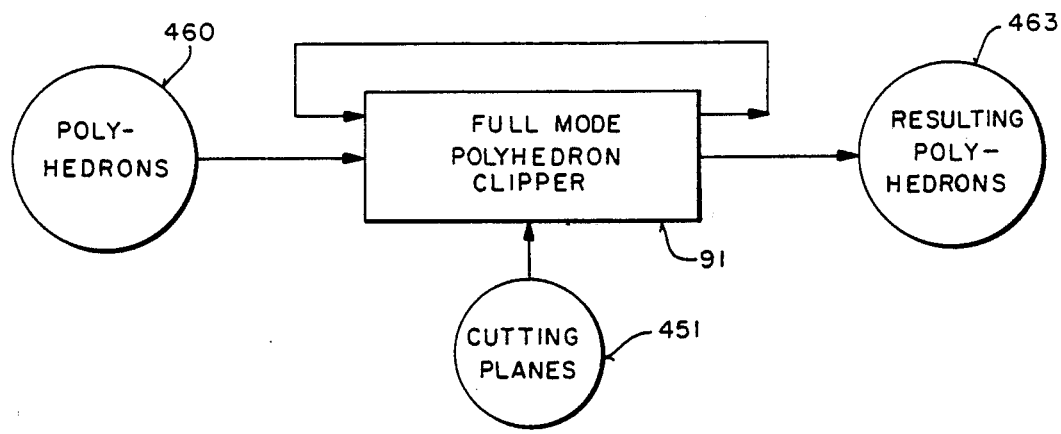

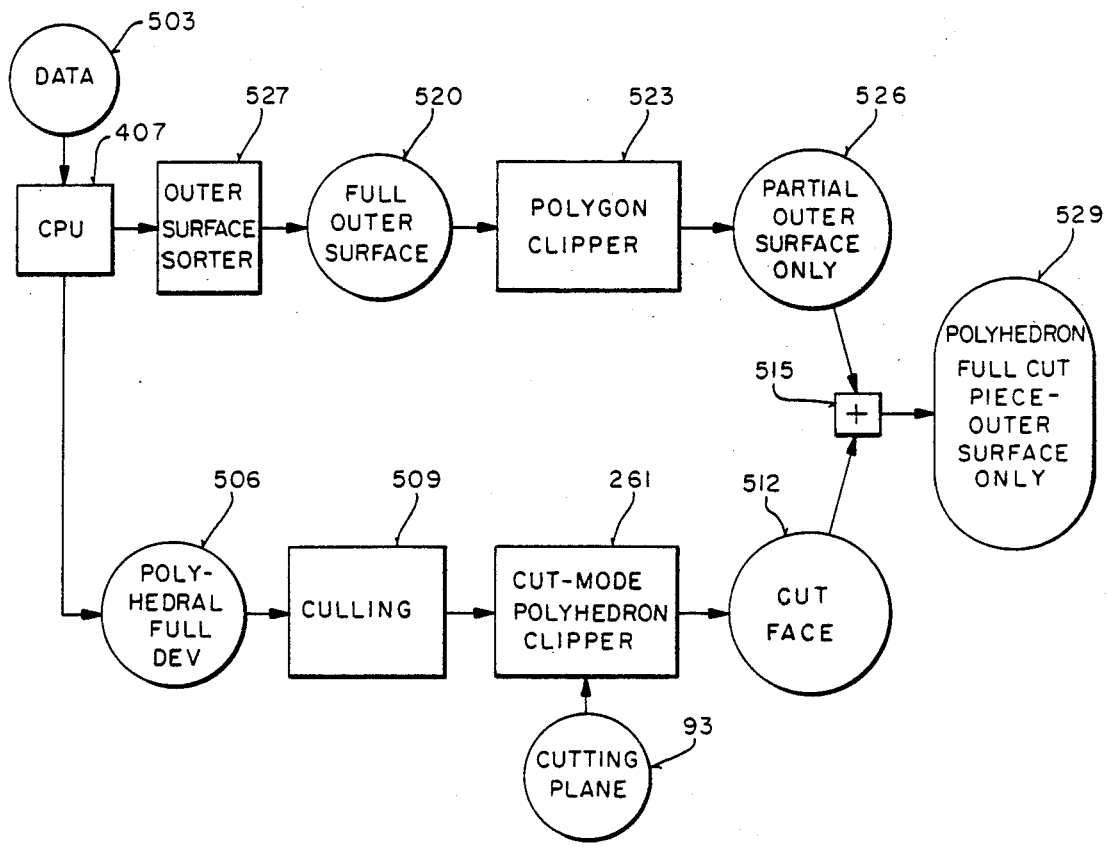
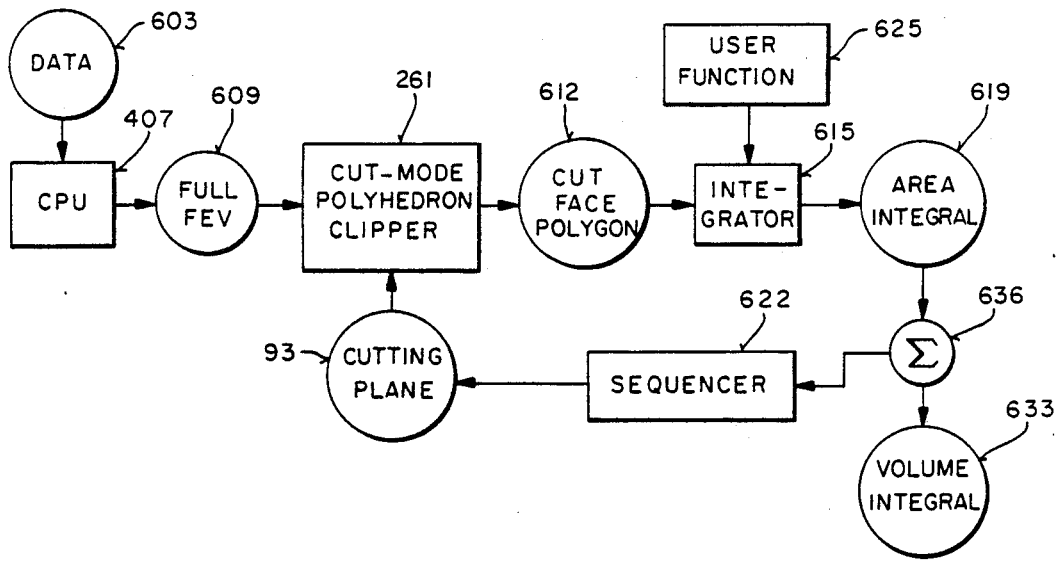

METHOD FOR FORMING A COMPUTER MODEL FROM AN INTERSECTION OF A CUTTING SURFACE WITH A BOUNDED VOLUME

FIELD OF THE INVENTION

The present invention pertains to the field of graphical display techniques for computers. More particularly this invention relates to a method for forming a computer model of a modified bounded volume representing portion of a bounded volume on a cutting surface and to one side of the cutting surface, and a method for forming a computer model of a cut-face representing an intersection of a cutting surface with a bounded volume.

BACKGROUND OF THE INVENTION

Graphical display techniques have been used on computers to allow the viewing of three-dimensional data on a two-dimensional viewing surface. Such graphical display techniques have been used in solids modeling and for viewing the results of finite element analysis and computational fluid dynamics, for example.

Solids modeling involves defining the geometry of an object to be displayed. Finite elements analysis involves the analysis of the physics of an object. Conventional methods of reviewing the results of finite elements analysis have included generating contour line plots for stress, color contour plots, and deformation and mode shape plots. Graphical display techniques for reviewing the results of computational fluid dynamics typically have used regular topology to define irregular geometry.

A limitation of many of the prior techniques for viewing three-dimensional results is that they display computed data only on the "visible outer surface" of the object. Unfortunately, "interesting" computed results do not always lie on the outer surface of a solid, but may in fact reside in its interior.

Prior three-dimensional viewing techniques have typically involved polygon clipping. A polygon is a closed plane figure having three or more sides. Polygon clipping refers to removing the portion of a given surface outside a given boundary. U.S. Pat. No. 3,816,726 of Sutherland et al. entitled COMPUTER-GRAPHICS CLIPPING SYSTEM FOR POLYGONS discloses a system for clipping three-dimensional polygons for use in a computer-graphics display. In particular, U.S. Pat. No. 3,816,726 discloses a technique for computing an intersection point between a line and a limiting plane.

U.S. Pat. No. 4,710,876 of Cline et al. entitled SYSTEM AND METHOD FOR THE DISPLAY OF SURFACE STRUCTURES CONTAINED WITHIN THE INTERIOR REGION OF A BOUNDED VOLUME BODY does disclose a method and apparatus for displaying surfaces contained within the interior regions of bounded volume bodies. U.S. Pat. No. 4,710,876 discloses the use of a voxel element defined by eight cubically-adjacent grid points. Said patent also discloses the use of a lookup table.

U.S. Pat. No. 4,694,404 of Meagher entitled HIGH-SPEED IMAGE GENERATION OF COMPLEX BOUNDED VOLUME OBJECTS USING OCTREE ENCODING discloses that areas of a view plane are tested to determine if they are completely enclosed by a projection, intersect but are not enclosed by the projection, or are completely disjoint with the projection. U.S. Pat. No. 4,694,404 discloses that areas that are completely enclosed by the projection are painted onto a display screen. Said patent discloses that areas which intersect but are not enclosed by the projection are further subdivided to locate those areas which are enclosed so that they, too, can be painted. Said patent discloses that the subdividing process continues until a predetermined degree of resolution is reached.

SUMMARY AND OBJECTS OF THE INVENTION

One objective of the present invention is to provide a method for forming a computer model that allows an operator to explore the internal structure of a bounded volume.

Another objective of the present invention is to provide a method for forming a computer model, wherein the method allows arbitrary cross-sectioning or isosurface generation or both.

Another objective of the present invention is to provide a method for forming a computer model of a modified bounded volume representing an intersection of a half-space with a bounded volume in order to better approximate arbitrary and complex topology and geometry.

Another objective of the present invention is to provide a method for forming a computer model of a cut face representing an intersection of a cutting surface with a bounded volume that minimizes computation time.

Another objective of the present invention is to provide a method for forming a computer model of a modified bounded volume representing an intersection of a half-space with a bounded volume that permits cutting surfaces to be located at arbitrary points.

Another objective of the present invention is to provide a method for forming a computer model of a modified bounded volume representing an intersection of a half-space with a bounded volume that permits multiple cutting surfaces.

Another objective of the present invention is to provide a method for forming a computer model of a modified bounded volume representing an intersection of a half-space with a bounded volume that permits area analysis of the cutting surface.

Another objective of the present invention is to provide a method for forming a computer model of a modified bounded volume representing a portion of the bounded volume on an isosurface and to one side of the isosurface.

Another objective of the present invention is to provide a method for forming a computer model of a modified bounded volume representing an intersection of a half-space with a bounded volume that permits field data interpolation through computation.

Another objective of the present invention is to provide a method for forming a computer model of a modified bounded volume representing an intersection of a half-space with a bounded volume that permits geometric cutting of a bounded volume, and the viewing throughout the bounded volume of results from finite element analysis, computational fluid dynamics analysis, or other physical models.

These and other objects of the invention are provided for by a method and apparatus for forming a computer model of a modified bounded volume representing an intersection of a half-space with a bounded volume comprised of a plurality of faces, edges, and vertices, wherein the half-space is comprised of points on a cutting surface into one side of a cutting surface. A first signed distance between (1) a first vertex on a first edge of a first face of the bounded volume and (2) the cutting surface is calculated. The first signed distance is positive if the first vertex resides outside of the half-space. The first signed distance is negative if the first vertex resides inside the half-space. The first signed distance is zero if the first vertex resides on the cutting surface. A second signed distance between (1) a second vertex on the first edge of the first face of the bounded volume and (2) the cutting surface is calculated. The second signed distance is positive if the second vertex resides outside of the half-space. The second signed distance is negative if the second vertex resides inside the half-space. The second signed distance is zero if the second vertex resides on the cutting surface. If both the first signed distance and the second signed distance are positive, then the first face is modified by deleting the first edge from the first face. If both the first signed distance and the second signed distance are negative, then the first edge on the first face is retained. If both the first signed distance and the second signed distance are zero, then the first edge on the first face is retained. If the first signed distance is of a different sign then the second signed distance, then the first face is modified by the modification of the first edge of the first face by interpolation. If one and only one of the first and second signed distances is zero, then the first edge of the first face is modified by interpolation. The above steps are repeated for each of the remaining edges of the bounded volume. Each next edge of the remaining edges becomes the first edge upon each repetition of said steps. If the first face has been modified and is missing an edge, then (1) a first cut-face edge is generated for the first face, (2) the first cut face stored, and (3) the first face is modified by adding the first cut-face edge to the first face. If the first face has been modified, then the first face is stored as modified. If the first face has not been modified, then the unmodified face is stored. The above steps following the generation of the list of edges is repeated for each of the remaining faces of the bounded volume. Upon each repetition of said steps, (1) each next face of the remaining faces becomes the first face and (2) each next cut-face edge becomes the first cut-face edge. A cut face is formed from the stored cut-face edges. The cut face is added to the stored faces of the bounded volume to form the modified bounded volume, wherein the modified bounded volume represent the intersection of the half-space with the bounded volume.

The above-mentioned objects and other objects of the invention are also provided for by a method and apparatus for forming a computer model of a cut face representing an intersection of a cutting surface with a bounded volume comprised of a plurality of faces, edges, and vertices. An edge visibility list is generated for each of the edges of the bounded volume, wherein an edge is visible to another edge if the two edges share a common face. A first signed distance between (1) a first vertex on a first edge of the bounded volume and (2) the cutting surface is calculated. The first signed distance is positive if the first vertex resides off the cutting surface at a first side of the cutting surface. The first signed distance is negative if the first vertex resides off the cutting surface at a second side of the cutting surface. The second side is opposite to the first side. The first signed distance is zero if the first vertex resides on the cutting surface. A second signed distance between (1) is a second vertex on a first edge of the bounded volume and (2) the cutting surface is calculated. The second signed distance is positive if the second vertex resides off the cutting surface at the first side of the cutting surface. The second signed distance is negative if the second vertex resides off the cutting surface at the second side of the cutting surface. The second signed distance is zero if the second vertex resides on the cutting surface. If the first signed distance is of a different sign then the second signed distance, or if one and only one of the first and second signed distances is zero, then (1) one of the first and second vertices of a first edge is modified by interpolation, (2) the modified vertex of the first edge of the bounded volume is stored, and (3) an edge cut-flag is set to indicate that the first edge of a bounded volume has been cut by the cutting surface. The steps following the generation of the edge visibility list are repeated for each of the remaining edges of the bounded volume. Each next edge of the remaining edges of the bounded volume becomes the first edge upon each repetition of said steps. If any of the edges of the bounded volume have been cut, then (1) there is a sequential stepping from the beginning of the edge list for a one of the cut edges until reaching a cut edge on the edge list, as indicated by the edge-cut flag for the cut edge reached in the edge list; (2) the modified vertex of the cut edge reached in the edge list is stored; (3) steps (1) and (2) immediately above are repeated for each of the remaining cut edges of the bounded volume, wherein the cut edge reached in the edge list becomes the one of the cut edges upon each repetition of steps (1) and (2); and (4) the cut face is formed from the stored modified vertices of the cut edges of the bounded volume.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 1 illustrates a four-node tetrahedron cut by a cutting surface;

FIG. 2 is a face, edge, and vertex representation for an eight-node brick;

FIG. 3 is a block diagram of a system of using a polyhedron clipper in conjunction with cellular decomposition of a bounded volume.

FIG. 4 illustrates a full mesh of a cube showing interior faces;

FIG. 5 illustrates exterior back and cut surfaces of a cube for a cut done by a polyhedron clipper;

FIG. 6 illustrates a full mesh of a piston showing interior faces;

FIG. 8 illustrates the input and output data associated with a polyhedron clipper and interpolator;

FIG. 9 illustrates edge list and face list extraction;

FIG. 10 illustrates an example of a face list and an edge list;

FIG. 11 illustrates input and output data associated with a distance finder of a polyhedron clipper;

FIG. 12 illustrates vector information associated with a cutting surface and a point above the cutting surface;

FIGS. 13A and 13B illustrate a flow chart of a method of clipping a polyhedron to produce a modified bounded volume;

FIG. 14 illustrates input and output data associated with a cut-mode polyhedron clipper and interpolator;

FIG. 15 illustrates input and output data associated with an edge visibility generator;

FIG. 16 illustrates a method and apparatus for forming a computer model of a cut face representing an intersection of a cutting surface with a polyhedron;

FIG. 17 is a block diagram of a system for using a polyhedron clipper to produce a front cut of a polyhedron;

FIG. 18 is a block diagram of a system for using a polyhedron clipper to produce multiple cuts and arbitrary cuts of a collection of polyhedra;

FIG. 19 is a block diagram of a system for forming the outer surface of a collection of polyhedra using a cut-mode polyhedron clipper in conjunction with a polygon clipper;

FIG. 20 illustrates a system for doing area analysis integration using a cut-mode polyhedron clipper;

DETAILED DESCRIPTION

Figure 7:
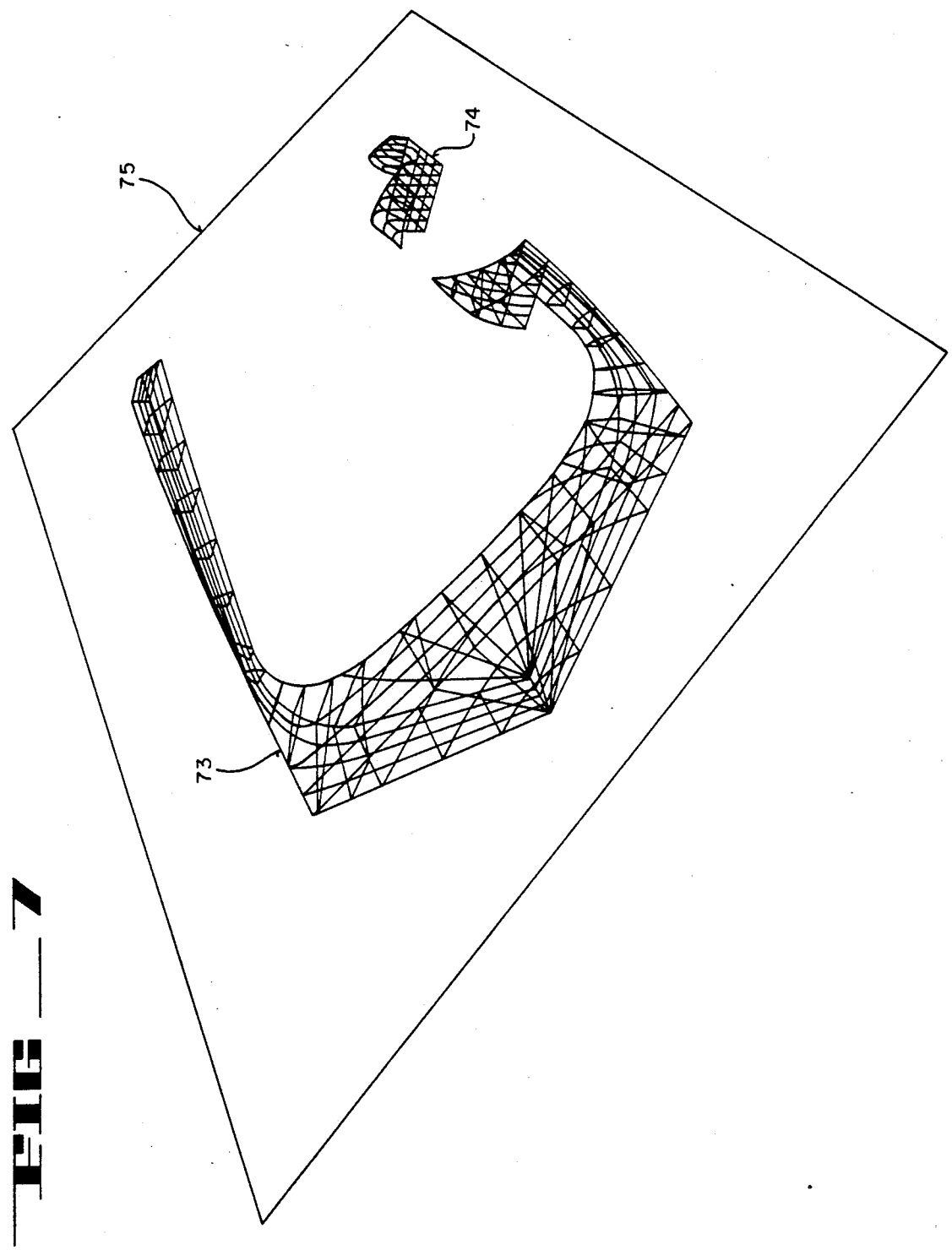
FIG. 7 illustrates exterior back and cut surfaces of a piston for a cut done by a polyhedron clipper.

Preferred embodiments of the present invention relate to computer graphical display methods for clipping a polyhedron. A polyhedron is a bounded volume having multiple faces. Polyhedron clipping, also referred to as polyhedron slicing, is a computer method wherein a computer-generated bounded volume is cut by a cutting surface at an arbitrary location.

According to one preferred embodiment of a present invention, a polyhedron slicing algorithm is used to generate a modified bounded volume that represents a portion of the bounded volume on a cutting surface and to one side of the cutting surface.

In another preferred embodiment of the present invention, a cut-mode polyhedron slicing algorithm is used to generate a cut face that represents an intersection of a cutting surface with a bounded volume.

In another preferred embodiment, a bounded volume is decomposed into a plurality of polyhedron-shaped cells, and each of the cells is cut according to either the full mode or cut-mode polyhedron slicing method.

FIG. 1 illustrates a tetrahedron 10, which is one type of polyhedron that can be cut according to either of the above preferred embodiments by a cutting surface and intersected by a space that includes the cutting surface and points to one side of the cutting surface.

Tetrahedron 10 of FIG. 1 has four vertices or nodes—namely, $v_1$, $v_2$, $v_3$, and $v_4$. Tetrahedron 10 is also comprised of (1) six edges $e_1$, $e_2$, $e_3$, $e_4$, $e_5$, and $e_6$, and (2) four faces $f_1$, $f_2$, $f_3$, and $f_4$.

In solids modeling, an object is often described in terms of its face, edge, and vertex ("FEV") topology. The faces, edges, and vertices of the object serve to describe the object's three-dimensional characteristics.

An edge can be described by the vertices of that edge. For example, for the tetrahedron of FIG. 1, edge $e_4$ is a line running from vertex $v_4$ to vertex $v_1$.

A face of an object can be described in terms of the face's vertices or edges or both. For example, face $f_2$ of the tetrahedron of FIG. 1 is described by vertices $v_1$, $v_2$, and $v_3$. Face $f_2$ is also described by edges $e_1$, $e_2$, and $e_3$.

Conventional FEV topology also describes a face in terms of a vector that is normal or perpendicular to the given face. In one convention used in FEV topology, the normal vectors for each of the faces of an object point away from the object. In another convention used in FEV topology, all the normal vectors for all the faces point into the object. In the present detailed description, the former convention is used, and it will be assumed that all the normal vectors for all the faces point outward from the object.

The direction of the normal vector for a face is governed by a right-hand rule. The direction along the edges describing the face gives the direction of the normal vector for the face according to the right hand rule. For example, for the tetrahedron of FIG. 1 an edge list properly describing the direction of the normal vector for face 1 is given either by $e_1$, $e_2$, and $e_3$ or by $-e_3$, $-e_2$, and $-e_1$. In terms of vertices, face 1 could also be described by $v_1$, $v_2$, and $v_3$.

In a preferred embodiment of the present invention, a user of a computer controls the cutting surface position and orientation using an input device, such as mouse. The mouse is linked to the cutting surface by a computer transformation. In an alternative of an embodiment of the present invention, the position and orientation of the cutting surface can be the result of a program calculation. For example, the position and orientation of the cutting surface can be a function of time or can be the result of a previous calculation.

FIG. 1 illustrates cutting surface 20 slicing through tetrahedron 10, and the results produced by a full mode polyhedron clipper and by a cut-mode polyhedron clipper. Space 22 is defined as comprising all points on cutting surface 20 and all points below cutting surface 22 in direction 18. The full mode polyhedron clipper produces modified bounded volume 14 shown in FIG. 1.

Modified bounded volume 14 represents the intersection of space 22 with tetrahedron 10. Modified bounded volume 14 is a fully enclosed figure with 5 faces. The top of modified bounded volume 14 is face $\overline{F}_5$. Modified bounded volume 14 is comprised of faces $\overline{F}_1$, $\overline{F}_2$, $\overline{F}_3$, $\overline{F}_4$, and $\overline{F}_5$.

In FIG. 1, cutting surface 20 is a planar cutting surface and space 22 is a half-space. Therefore, in FIG. 1, modified bounded volume 14 is a modified tetrahedron that represents the intersection of half-space 22 with tetrahedron 10. Moreover, because cutting surface 20 is a plane, cut face $F_5$ is a polygon. A polygon is a closed plane figure bounded by three or more line segments.

Certain edges of tetrahedron 10 were cut in order to form modified bounded volume 14. In particular, edges $e_2$, $e_3$, and $e_6$ of tetrahedron 10 were cut in forming modified bounded volume 14 according to a preferred algorithm.

Modified bounded volume 14 is comprised of edges $e_1$, $e_{2b}$, $e_{ab}$, $e_{a1}$, $e_5$, $e_4$, $e_{4c}$, $e_{bc}$, and $e_{cd}$. Modified bounded volume 14 is also comprised of vertices $v_1$, $v_2$, $v_4$, $\overline{v}_a$, $\overline{v}_b$, $\overline{v}_c$. Vertices $\overline{v}_a$, $\overline{v}_b$, and $\overline{v}_c$ are the modified vertices associated with polygon cut face 12.

In contrast, cut-mode polyhedron clipping algorithm produces cut face 12 shown in the lower left side of FIG. 1. Cut face 12 is comprised of edges $e_{ab}$, $e_{bc}$, $e_{ca}$, and vertices $\overline{v}_a$, $\overline{v}_b$, and $\overline{v}_c$, and cut face 12 is equivalent to face $\overline{F}_5$.

In FIG. 1, given that cutting surface 20 is planar, cut face 12 is therefore a polygon. For the orientation shown in FIG. 1 of cutting plane 20, cut face 12 is a triangular polygon.

If, alternatively, a cutting plane cut edges $e_3$, $e_6$, $e_1$, and $e_5$, then the cut face would be a four-sided polygon.

The full mode and cut mode polyhedron clippers can also act on field data. Field data is a data that can be associated with each of the geometric coordinate points in three-space. In other words, each geometric point can have one or more items of information associated with the point other than just geometric information. Field data can include, for example, stress, temperature, and pressure associated with each geometric coordinate.

In an alternative embodiment of the present invention, cutting surface 20 could be an isosurface with respect to field data. The cutting isosurface would represent points having the same constant value of field data. The cutting isosurface would divide a bounded volume into two or more modified bounded volumes.

Given that the cutting isosurface is defined in terms of a constant value of field data, the geometric points associated with the isosurface may or may not line in the same plane.

The use of the full mode polyhedron clipper with a cutting surface that is an isosurface results in one or more modified bounded volumes representing a portion or portions of a bounded volume on the cutting isosurface and to one side of the cutting surface. Each of the one or more cut faces of the modified bounded volume or volumes that result may or may not be planar.

The use of the cut-mode polyhedron clipper with a cutting surface that is an isosurface results in one or more cut faces representing an intersection or intersections of the cutting surface with the bounded volume. Each of the one or more cut faces that result may or may not be planar.

Thus, full mode polyhedron clipping can be used to generate one or more modified bounded volumes representing a portion or portions of a bounded volume on an isosurface and to one side of the isosurface. In addition, cut mode polyhedron clipping can be used to generate one or more cut faces representing an intersection or intersections of an isosurface with a bounded volume.

The tetrahedron is the simplest polyhedron upon which the full mode and cut-mode polyhedron clippers can act. Preferred full mode and cut mode polyhedron clippers of the present invention can be used on polyhedrons more complex than the tetrahedron.

For example, FIG. 2 illustrates a FEV representation of an eight-node isoparametric brick element 30 that can be used as the bounded volume upon which the full mode and cut mode polyhedron clipper operates. Eight-node brick 30 is comprised of (1) six faces $F_{10}$ through $F_{16}$, (2) twelve edges $e_{11}$ through $e_{22}$, and (3) eight vertices $v_{10}$ through $v_{18}$.

For the full mode and cut mode polyhedron clippers of the present invention, each polyhedron should be (1) convex, (2) planar-faced, and (3) straight edged. Convex means that a line between any two points, both of which lie within the bounded volume, will stay within the bounded volume and not exit the bounded volume. The tetrahedron 10 of FIG. 1, for example, is convex, planar-faced, and straight-edged.

If the full mode and cut mode polyhedron clippers are used for a plurality of cells of a bounded volume, then each cell should be (1) quasi-disjoint, (2) convex, (3) planar-faced, and (4) straight-edged. Quasi-disjoint means that polyhedrons at most share only vertices, edges, or faces, but not points in their interiors.

In general, a properly defined finite element mesh will satisfy the quasi-disjoint requirement. In general, well-formed elements will also satisfy the convex requirement. Nevertheless, not all elements in a finite element model will satisfy the planar-faced requirement. For example, linear isoparametric faces may be non-planar due to the method by which they were generated. In addition, higher order isoparametric elements with curved faces and edges play an important role in some problem classes.

Nevertheless, the preferred full-mode and cut-mode polyhedron clippers of the present invention can be configured to handle irregular, complex, and arbitrary topology and geometry. FIG. 3 shows that the use of cellular decomposition of a bounded volume together with polyhedron clipping of each cell. Geometric data 30 for bounded volume 41 is first applied to cellular decomposition circuitry 44. Cellular decomposition circuitry 44 decomposes bounded volume 41 into numerous cells, the assembly of which comprise the bounded volume 41, also referred to as bounded volume S. Generally, each of the cells is a quasi-disjoint, planar-faced straight-edged polyhedron.

The cellular decomposition of bounded volume 41 (also referred to as bounded volume S) into a set of n cells $S_i$ is given by the following:

$$S = \bigcup_{i=1}^{n} * S_i$$

The polyhedron can be constrained to be convex with no loss of generality. Either the cut-face polyhedron clipping algorithm discussed below may be generalized or non-convex polyhedra may be triangularized into a set of convex polyhedra.

The method of triangularization is as follows. In order to handle irregular or complex geometries, those elements with non-planar faces need to be triangulated into planar-faced polyhedra during a pre-processing phase of the computer program. This triangularization is also shown by box 44 in FIG. 3. If elements sharing common faces triangulate that face identically, then no voids will appear in the model. However, interpolated values may suffer some loss of accuracy due to the resulting change in the interpolation basis.

Triangulated non-planar faces on the exterior of the model may, however, introduce a small amount of geometric error. For display purposes, those errors are of little consequence, however.

In other words, any elements violating the above-mentioned cell restrictions are reduced to simpler form in box 44 of FIG. 3.

Polyhedron clipper 47 then acts on each cell of the cellular decomposition. The polyhedron clipper clips one cell, then clips the next cell, then clips the following cell, etc., until all the cells have been clipped. In other words, the polyhedron clipper loops through all the cells, clipping one cell at a time.

If the full-mode polyhedron clipper is used, then on each loop the full mode polyhedron clipper forms a modified cell representing a portion of the cell on a cutting surface and to one side of the cutting surface. If the cut-mode polyhedron clipper is used, then on each loop the cut-mode polyhedron clipper forms a cut face for the cell, wherein the cut face represents an intersection of the cutting surface with the cell.

For the full mode polyhedron clipper, an assembly 50 of the modified cells represents a modified bounded volume representing a portion of bounded volume 41 on a cutting surface and to one side of the cutting surface.

For the cut-mode polyhedron clipper, an assembly 50 of the cut faces for the cells represents the intersection of the cutting surface with bounded volume 41.

The assembly 50 of modified cells or cut faces for the cells can then be displayed on display 54.

For geometric cutting, if $\bar{S}$ is defined as the regularized intersection of bounded volume model S with a half-space H defined by a cutting surface P, then $\bar{S}$ is given by the following equation:

$$\bar{S} = S \cap {}^* H = \bigcup_{i=1}^{n} {}^* (S_i \cap {}^* H)$$

Thus, it is sufficient to intersect all the component cells one by one with the half-space H and union the results.

In contrast, in the cut mode of polyhedron slicing, a face list is generated. The face list consists of only those cellular faces, either original or generated, lying on the cutting surface P. This allows the rapid calculation of cross sections of the bounded volume 41 with the cutting surface P. The assembly of the cut faces for the cells can be displayed on graphical display 54.

FIG. 4 illustrates a full mesh of an $11 \times 11 \times 11$ cube 60 showing interior faces. Cube 60 of FIG. 4 is an example of a complex bounded volume 41 that, nevertheless, is decomposed into small quasi-disjoint, planar-faced, straight-edged polyhedron cells. Although cube 60 is geometrically simple, the interior subdivision is required to explore the spatial variations of computed values.

FIG. 5 illustrates the exterior back and cut surfaces of cube 63 for a cut by cutting surface 65. Bounded volume 63 represents the intersection of a half-space bordered by cutting surface 65 with cube 60. Bounded volume 63 is the result of cut-mode polyhedron clipping of each of the cells of cube 60. Bounded volume 63, which includes cut face 67, is a result of an assembly of the results of polyhedron clipping of each cell of bounded volume 63.

FIG. 6 illustrates a quarter symmetric model 70 of a piston under pressure load. Piston 70 is an example of a complex bounded volume. FIG. 6 illustrates a full mesh of piston 70 showing interior faces.

FIG. 7 illustrates objects 73 and 74 that are the result of a cut mode polyhedron clipping of piston 70. The cut mode polyhedron clipping was done for each of the cells of piston 70, and the results where then assembled to form objects 73 and 74. Cutting surface 75 is also shown in FIG. 7. FIG. 7 illustrates the exterior back and cut surfaces of piston 70 for cutting surface 75.

As described more fully below, either full mode or cut mode polyhedron clipping can be used for solids modeling and geometric cutting. Full mode or cut-mode polyhedron clipping can also be used to view the results of finite element analysis and computational fluid dynamics, for example.

FIG. 8 illustrates the flow of data to and from a full mode polyhedron clipper and interpolator 91. Geometric data 81 for bounded volume 82 is first applied to pre-processing stage 83 which, if necessary, can decompose bounded volume 82 into a union of smaller cells, or which can triangularize the cells in order to best approximate the shape of an irregular or complex bounded volume. Each cell must be a quasi-disjoint, planar-faced, straight-edged, convex polyhedron. Cellular decomposition or triangularization might not be necessary, however, if bounded volume 82 is comprised of a collection of simple quasi-disjoint, convex, planar-faced, straight-edged, polyhedrons.

Pre-processing stage 83 produces FEV topology data 85 for each of the cells. Full mode polyhedron clipper and interpolator 91 processes FEV topology data 85 for each cell at a time. Coordinate data 87 for points $x_i$ in three-space is applied to full mode polyhedron clipper and interpolator 91. Field data 89 represented by $\phi_i$ is also applied to full mode polyhedron clipper and interpolator 91. Multiple field quantities may be processed simultaneously—for example, stress tensors may be processed simultaneously.

Coordinate data 87 is comprised of the points making up the entire three-space. Bounded volume 82 resides somewhere within that three-space.

Field data 89 is data associated with points in three-space. Field data 89 for one point can comprise, for example, stress, temperature, pressure, or color associated with that particular point. Accordingly, different points within three-space can have different values of field data associated with them. Field data is useful in finite element analysis in analyzing the physics of a bounded volume. Field data facilitates the display of the results of physical analysis of an object, not only on the surface of a model, but also throughout its interior. There is a one-to-one mapping between the components of the bounded volume model and the components of a three-dimensional finite element model that uses field data.

Cutting surface 93 is also applied as an input to full mode polyhedron clipper and interpolator 91. Cutting surface 93 can be a cutting plane. Alternatively, cutting surface 93 can be an isosurface.

If tetrahedron 10 of FIG. 1 was one of the polyhedron cells to be clipped, then the FEV topology 85 input to the full mode polyhedron clipper and interpolator 91 would be the FEV topology of tetrahedron 10. Cutting plane 20 could then be the cutting surface applied to full mode polyhedron clipper 91.

A cutting plane can be defined mathematically as a vector R to the plane and a vector N that is normal to the plane.

The output of the full mode polyhedron clipper and interpolator is new FEV topology 95, new coordinate data 97, and new field data 99.

The new FEV topology would be for the modified cells. For example, if tetrahedron 10 was one of the cells clipped by full mode polyhedron clipper 91, then the FEV topology of modified cell 14 shown in FIG. 1 would be output from full mode polyhedron clipper 91.

New coordinate data 97 represented by $\bar{x}_i$ represents new coordinate data for the modified cells.

New field data 99 represented by $\bar{\phi}_i$ represents new field data for the modified cells. New field data 99 would include new field data for modified bounded volume 14, for example, if tetrahedron 10 was one of the cells clipped by full mode polyhedron clipper and interpolator 91.

The new FEV topology 95 for each of the cells clipped by the polyhedron clipper is applied to post-processing stage 101. Post-processing stage 101 can assemble the modified cells in order that a new modified bounded volume can be displayed by display 54. Post-processing stage 101 could be used for both straight cuts and isosurface generation.

The new field data 99 associated with the modified cells is also applied to post-processing stage 101. Post-processing stage 101 can assemble the new field data 99 in order to obtain new field data for the entire modified bounded volume.

The new coordinate data 97 can be sent to display 54 in order to display such things as the cutting surface, for example.

Data from post-processing stage 101 can also be sent to pre-processing stage 83 for further clipping by full mode polyhedron clipper 91.

FIGS. 9 through 12 and FIGS. 13A and 13B illustrate the steps involved in performing a full mode polyhedron clipping operation. For discussion purposes, tetrahedron 10 being cut by cutting surface 20 is used as an example of one of the cells being clipped. It is to be appreciated, however, that other bounded volumes, including an eight-node brick, or complex and irregular bounded volumes, can be clipped during a full mode polyhedron clipping operation. The result of full mode polyhedron clipping operation is a computer model of a modified bounded volume representing a portion of a bounded volume on a cutting surface and to one side of the cutting surface. The cutting surface can be a geometric planar cutting surface or a field data isosurface.

FIG. 9 illustrates edge list and face list extraction. The FEV topology data 85 for the cell to be clipped is applied to edge list extractor 111. Edge list extractor 111 outputs edge list 115 for the FEV polyhedron data 85.

Edge list 115 is a list of the edges of the polyhedron. For example, if tetrahedron 10 is to be clipped, then edge list 115 will list edges $e_1$ through $e_6$ of tetrahedron 10. Each edge list listed in edge list 115 is defined in terms of two endpoint vertices for that edge.

Face list extractor 112 outputs face list 116 for the FEV polyhedron data 85. Face list 112 is a list of the faces of the polyhedron.

In one embodiment of the present invention, face list and edge list extraction can first be done for all the cells of a bounded volume, and then each cell can be clipped.

FIG. 10 sets forth the relationships of the faces, edges, and vertices of tetrahedron 10 of the FIG. 1. Column A of FIG. 10 is a face list for tetrahedron 10, which lists the faces of tetrahedron 10 in terms of the edges of tetrahedron 10. Column B of FIG. 10 lists the vertices of tetrahedron 10 for each of the faces of tetrahedron 10. Column C is the edge list for tetrahedron 10. Column C defines each edge of tetrahedron 10 in terms of the vertices of tetrahedron 10. Column D lists the faces that intersect each edge of tetrahedron 10.

It is to be noted that the signs for the faces, edges, and vertices conform to the right-hand rule for outward pointing face vectors.

FIG. 11 illustrates the input and output data for distance finder 121 algorithm of both the full mode polyhedron clipper 91 and for the cut mode polyhedron clipper. Coordinate data $x_i$ is applied as an input to the distance finder 121. In addition, data defining cutting surface 93 is input into distance finder 121.

Field data $\phi_i$ and $\phi_0$ are also applied as inputs to distance finder 121. Field data $\phi_0$ can define an isosurface used for isosurface cuts of a polyhedron.

The output of distance finder 121 is signed distance list 123. The entries of signed distance list 123 are designated $d_i$. For geometric cutting, a distance $d_i$ is negative if the coordinate $x_i$ is inside a half-space, wherein the half-space is comprised of points on a cutting surface and to one side of a cutting surface. The signed distance $d_i$ is zero if the coordinate data $x_i$ is on the cutting surface. The signed distance $d_i$ is positive if the coordinate datum $x_i$ is outside the half-space bordered by the cutting surface.

The magnitude of distance $d_i$ for coordinate $x_i$ is the shortest distance that $x_i$ is away from the cutting surface.

For example, if point $x_i$ resided above cutting surface 20, then the signed distance $d_i$ would be positive. In contrast, if point $x_i$ resided in space 22, then distance $d_i$ would be negative. If point $x_i$ was on cutting surface 20, then $d_i$ would be zero.

In an alternative embodiment of the present invention, the sign convention for the signed distances could be reversed. In other words, in an alternative embodiment, a signed distance $d_i$ would be negative for geometric cutting if point $x_i$ was above the cutting surface, and $d_i$ would be positive if point $x_i$ was in space 22.

Returning to the preferred embodiments for both the full mode and cut mode polyhedron clippers, distance finder 121 can be used to find the distance between (1) every point $x_i$ in three-space and (2) the cutting surface, such as cutting surface 20. The signed distance $d_i$ is the shortest distance to the cutting surface, so by definition the vector defining the signed distance is perpendicular to the cutting surface.

Distance finder 121 can also be used for the full mode and cut mode polyhedron clippers to find the generalized signed distance between field data $\phi_i$ and the isosurface $\phi_0$. The isosurface can be a cutting surface.

For an isosurface cutting surface, the magnitude of the generalized signed distance di is the difference between $\phi_i$ and $\phi_0$.

Moreover, for an isosurface cutting surface, a generalized signed distance di is negative if the field data $\phi_i$ associated with a coordinate point, such as a vertex, resides at a first side of the isosurface $\phi_0$. The distance di is positive if the field data $\phi_i$ does not reside to the first side of the isosurface $\phi_0$ and does not reside on the isosurface $\phi_0$. The signed distance is zero if the field data $\phi_i$ resides on the isosurface $\phi_0$.

FIG. 12 illustrates vector information useful in understanding how distance finder 121 operates for geometric cutting to generate signed distances $d_i$. FIG. 12 shows three-space axes X, Y, and Z. Point 131 having X, Y, and Z coordinates (0, 0, 0) is designated the origin, and resides in a corner of three-space.

Signed distance finder 121 is used to calculate the signed distance between (1) point x, having X, Y, Z coordinates ($x_1$, $x_2$, $x_3$), and (2) planar cutting surface 20, also referred to as cutting plane P. For data manipulation purposes, it is useful to define point x in terms of vector X, which points from origin 131 to point x. Because vector X does begin at origin 131, vector X can simply be defined in terms of X, Y, Z coordinates ($x_1$, $x_2$, $x_3$).

Vector R is defined as a vector running from origin 131 to any point r on cutting surface P. Point r and vector R both have X, Y, Z coordinates ($r_1$, $r_2$, $r_3$), given that vector R runs from the origin 131.

Vector N is defined as a normal vector of unit length that is perpendicular to any point on cutting surface P. The magnitudes of the X, Y, Z coordinates of vector N are given by ($n_1$, $n_2$, $n_3$). Given that vector N is defined to be of unit length, it follows that:

$$n_1^2 + n_2^2 + n_3^2 = 1.$$

It follows that cutting surface P can be defined in terms of vectors X, R, and N as follows:

$$P = \{x \mid (x-R) \cdot N = 0\}.$$

Half-space H (also referred to as half-space 22) may be defined as the points to one side of cutting surface P. Half-space H can also be defined as follows:

$$H = \{x \mid (dist(x,P) \leq 0\}$$

It follows that the signed shortest distance $d_i$ from point x to any point on cutting surface P is given by:

$$dist(x,P) = (X-R) \cdot N.$$

$(X-R) \cdot N$ is the vector dot product of vectors X, R, and N. That vector dot product is equal to the following expression in terms of X, Y, Z coordinates:

$$(x_1-r_1)n_1 + (x_2-r_2)n_2 + (x_3-r_3)n_3.$$

It follows that the signed shortest distance $d_i$ is also equal to:

$$(x_1-r_1)n_1 + (x_2-r_2)n_2 + (x_3-r_3)n_3.$$

Therefore, once distance finder 121 is given a point x (or a vector X) and the vector R and N defining a cutting surface P, distance finder 121 performs the dot product $(x-R) \cdot N$ to calculate the shortest signed distance $d_i$ from point x to any point r on cutting surface P.

In contrast, for field data, the generalized signed distance di between field data $\phi_i$ and a cutting surface defined by isosurface $\phi_0$ is given by:

$$dist(\phi_i, \phi_0) = \phi_i - \phi_0.$$

Thus, the generalized signed distance between the field data and the isosurface is the signed difference between the field data and the isosurface value.

FIGS. 13A and 13B set forth a flow chart that illustrates the preferred full mode method of clipping a polyhedron to produce a modified bounded volume representing a portion of a bounded volume on a cutting surface and to one side of the cutting surface. The method set forth in FIGS. 13A and 13B is done for each polyhedron cell at a time. Said method is repeated for each of the cells, until all the cells have been clipped.

Sequencer 141 sequences through edge list 115 one edge at a time. The method steps for the flow chart set forth in FIG. 13A are therefore for one edge at a time.

Sequencer 141 first retrieves the data associated with the first edge stored in edge list 115, and stores that data in buffer 144. Thus, for an edge $e_i$ of edge list 115, sequencer 141 stores vertices $v_{1i}$ and $v_{2i}$ in buffer 144. For tetrahedron 10 of FIG. 1 as the cell being clipped, the first edge in edge list 115 is edge $e_1$. Edge list 115 shows that vertices $v_1$ and $v_2$ are the endpoints for edge $e_1$. Therefore, sequencer 141 stores $e_1$ in buffer 144 along with vertices $v_1$ and $v_2$ if tetrahedron 10 is being sliced.

Selector 147 then retrieves from the signed distance list 123 (1) a signed distance $d_{1i}$ associated with vertex $v_{1i}$ and (2) a signed distance $d_{2i}$ associated with vertex $v_{2i}$. Selector 147 stores the retrieved signed distances $d_{1i}$ and $d_{2i}$ in buffer 150. For tetrahedron 10, selector 147 would retrieve from signed distance list 123 (1) signed distance $d_{11}$ for vertex $v_1$ and (2) signed distance $d_{22}$ for vertex $v_2$. Selector 147 would then store signed distances $d_{11}$ and $d_{22}$ in buffer 150.

In view of the nature of signed distance list 123, as discussed above in connection with FIGS. 11 and 12, the magnitude of the signed distance $d_{1i}$ for geometric cutting is the shortest distance between vertex $v_{1i}$ and cutting surface P. This follows from the facts that (1) the vertex $v_{1i}$ is also a point in three-space equivalent to a point $x_i$ occupying the same position in three-space and (2) signed distance list 123 contains signed distances $d_i$ for each of the points $x_i$ in three-space. Similarly, the magnitude of the signed distance $d_{2i}$ for geometric cutting is the shortest distance between vertex $v_{2i}$ and cutting surface P.

Furthermore, for geometric cutting, the sign of the signed distance $d_{1i}$ shows whether vertex $v_{1i}$ resides (1) outside of half-space H (i.e., a positive sign) or (2) inside of half-space H (i.e., a negative sign). If signed distance $d_{1i}$ is equal to zero, this shows that vertex $v_{1i}$ resides on cutting surface P. Similarly, the sign of signed distance $d_{2i}$ and whether or not $d_{2i}$ is zero specifies the location of vertex $v_{2i}$ relative to half-space H and cutting surface P.

For geometric cutting of cell tetrahedron 10, $d_{11}$ and $d_{22}$ are both negative because respective vertices $v_1$ and $v_2$ fall inside of half-space 22.

For cutting by an isosurface, the magnitude of signed distance $d_{1i}$ is the difference between (1) field data $\phi_{1i}$ associated with vertex $v_{1i}$ and (2) isosurface $\phi_0$. Similarly, the magnitude of signed distance $d_{2i}$ is the difference between (1) field data $\phi_{2i}$ associated with vertex $v_{2i}$ and (2) isosurface $\phi_0$.

In addition, for cutting by an isosurface, the generalized signed distance $d_{1i}$ is negative if the field data $\phi_{1i}$ associated with vertex $v_{1i}$ resides at a first side of the isosurface $\phi_0$. The generalized signed distance $d_{1i}$ is positive if the field data $\phi_{1i}$ associated with vertex $v_{1i}$ does not reside to the first side of the isosurface $\phi_0$ and does not reside on the isosurface $\phi_0$. The signed distance $d_{1i}$ is zero if the field data $\phi_{1i}$ resides on the isosurface $\phi_0$. Similarly, the sign of signed distance $d_{2i}$ and whether or not $d_{2i}$ is zero specifies the location of the field data $\phi_{2i}$ associated with vertex $v_{2i}$ relative to the isosurface $\phi_0$.

Comparator 153 then checks signed distances $d_{1i}$ and $d_{2i}$ to see (1) if they are of opposite sign or (2) if one and only one of signed distances $d_{1i}$ and $d_{2i}$ is zero. That is, comparator 153 determines whether (1) $d_{1i}$ is positive and $d_{2i}$ is negative, (2) $d_{1i}$ is negative and $d_{2i}$ is positive, (3) $d_{1i}$ is zero and $d_{2i}$ is nonzero, or (4) $d_{1i}$ is nonzero and $d_{2i}$ is zero.

If comparator 153 determines either that (1) signed distances $d_{1i}$ and $d_{2i}$ are of opposite sign or (2) one and only one of signed distances $d_{1i}$ and $d_{2i}$ is zero, then selector stage 168, described below, becomes the next step in the method of polyhedron clipping.

If, however, comparator 153 determines that (1) signed distances $d_{1i}$ and $d_{2i}$ are both nonzero and have the same sign or (2) signed distances $d_{1i}$ and $d_{2i}$ are both zero, then comparator stages 156 and 162 become the next steps.

Comparator stage 156 checks to see whether both signed distances $d_{1i}$ and $d_{2i}$ are positive. If both signed distances $d_{1i}$ and $d_{2i}$ are positive, then edge $e_i$ associated with signed distances $d_{1i}$ and $d_{2i}$ is placed on delected edge list 159. Deleted edge list 159 stores a list of edges that are to be deleted when the faces of the polyhedron are processed according to the steps shown in FIG. 13B. If both signed distances $d_{1i}$ and $d_{2i}$ are not positive, then edge $e_i$ associated with signed distances $d_{1i}$ and $d_{2i}$ is not placed on deleted edge list 159.

Comparator 162 checks to see whether (1) both signed distances $d_{1i}$ and $d_{2i}$ are negative or (2) both signed distances $d_{1i}$ and $d_{2i}$ are zero. If both signed distances $d_{1i}$ and $d_{2i}$ are negative or zero, then edge $e_i$ associated with signed distances $d_{1i}$ and $d_{2i}$ is placed on "keep edge" list 165. "Keep edge" list 159 stores a list of edges that are neither deleted nor modified when the faces of the polyhedron are processed according to the steps shown in FIG. 13B. In other words, any edge on "keep edge" list 159 is retained when the faces of the polyhedron are further processed as part of the polyhedron slicing algorithm.

For geometric cutting of tetrahedron cell 10, signed distances $d_{11}$ and $d_{22}$ are both negative. Therefore, the comparisons made at steps 153 and 162 would result in edge $e_1$ (associated with signed distances $d_{11}$ and $d_{22}$) to be stored in "keep edge" list 165.

As discussed above, selector stage 168 is only entered if comparator 153 determines either that (1) signed distances $d_{1i}$ and $d_{2i}$ are of opposite signs or (2) one and only one of signed distances $d_{1i}$ and $d_{2i}$ is zero.

Selector 168 selects from the coordinate data $X_i$ the coordinate data point $x_{1i}$ that is equivalent to vertex $v_{1i}$. Selector 168 also selects from the coordinate data $X_i$ the coordinate data point $x_{2i}$ that is equivalent to vertex $v_{2i}$. Selector 168 then places coordinates $x_{1i}$ and $x_{2i}$ in buffer 171.

Selector 168 also places signed distances $d_{1i}$ and $d_{2i}$ (associated respectively with vertices $v_{1i}$ and $v_{2i}$) in buffer 171.

Selector 168 also selects from the field data $\Phi$ the field data $\phi_{1i}$ associated with vertex $v_{1i}$. Selector 168 also selects from the field data $\Phi$ the field data $\phi_{2i}$ associated with vertex $v_{2i}$. Selector 168 then places field data $\phi_{1i}$ and $\phi_{2i}$ in buffer 171.

Given the presence of comparator stage 153, interpolation stage 174 is only entered if the particular edge being processed has been cut by the cutting surface P. Interpolator 174 is used to generate a new vertex $v_{1,2i}$ that is located at the intersection of the edge $e_i$ being processed and the cutting surface. The new vertex $v_{1,2i}$ is one of the vertices of a modified edge. The other vertex ($v_{1i}$ or $v_{2i}$) of the modified edge remains the same. The modified edge represents a portion of the edge intersecting the cutting surface and to one side of the cutting surface for the particular edge $e_i$ being processed.

Interpolator 174 produces the new vertex $v_{1,2i}$ by interpolating the coordinate data $x_{1i}$ and $x_{2i}$ (both stored in buffer 171) in view of the signed distances $d_{1i}$ and $d_{2i}$ (both also stored in buffer 171). What results is a new coordinate point $x_{1,2i}$ that is equivalent to the new vertex $v_{1,2i}$. New coordinate point $x_{1,2i}$ is located at the intersection of the edge being processed (i.e., edge $e_i$) and the cutting surface. In other words, point $x_{1,2i}$ represents the coordinates of the new vertex $v_{1,2i}$. The new vertex is also referred to as $\bar{v}$.

Interpolator uses the following equation in calculating new vertex $v_{1,2i}$ (corresponding to new coordinate $x_{1,2i}$):

$$\bar{v} = a_1 v_1 + a_2 v_2.$$

For the above equation, $$a_1 = |d_2|/(|d_1| + |d_2|)$$

$$a_2 = |d_1|/(|d_1| + |d_2|)$$

In addition, $$d_1 = dist(v_1; P)$$

$$d_2 = dist(v_2; P)$$

Interpolator 174 places the new coordinate $x_{1,2i}$ in buffer 177.

Distance $d_{1,2i}$ placed in buffer 177 by interpolator 174 is equal to zero, given that coordinate $x_{1,2i}$ is on the cutting surface P.

Interpolator 174 also calculates modified edge $e_{1,2i}$ (also referred to as edge $\bar{ek}$) and places that modified edge in modified edge buffer 180. Interpolator 174 calculates the modified edge $e_{1,2i}$ according to the following:

$$e_k = \begin{cases} (v_1, v_2) & \text{if } d_1 = 0 \text{ and } d_2 = 0 \\ (v_1, v) & \text{if } d_1 < 0 \text{ and } d_2 \geq 0 \\ (v, v_2) & \text{if } d_2 < 0 \text{ and } d_1 \geq 0 \\ \phi & \text{otherwise} \end{cases}$$

Modified edge buffer 180 receives the unmodified vertex $v_{1i}$ or $v_{2i}$ (associated with edge $e_i$) from buffer 144. Modified edge buffer 180 also stores the designation of the original edge $e_i$ associated with modified edge $e_{1,2i}$ in order to keep track of which edge has been modified.

Interpolator 174 also interpolates field data $\phi_{1i}$ and $\phi_{2i}$ from buffer 171 according to the following equation:

$$\bar{\Phi} = a_1 \phi_1 + a_2 \phi_2$$

wherein $$a_1 = |d_2|/(|d_1| + |d_2|)$$

$$a_2 = |d_1|/(|d_1| + |d_2|)$$

and wherein $$d_1 = dist(v_1; P)$$

$$d_2 = dist(v_2; P)$$

The interpolation of the field data $\phi_{1i}$ and $\phi_{2i}$ by interpolator 174 results in field data $\phi_{1,2i}$ that corresponds to new coordinate point $x_{1,2i}$ for new vertex $v_{1,2i}$. This facilitates the display of results from finite element analysis involving field data.

Field data $\phi_{1,2i}$ from interpolator 174 is also stored in buffer 177.

As a next step of the method of the full mode polyhedron clipper, sequencer 141 retrieves a next edge from edge list 115. That next edge is processed in the same manner described above for the first edge. For example, signed distances are selected at step 147. Comparisons are made at steps 153, 156, and 162. Depending upon the comparisons, either (1) that next edge is added to deleted edge list 159, (2) that next edge is added to "keep edge" list 165, or (3) that next edge is modified by interpolator 174, and the modified edge is placed in modified edge buffer 180.

The above process of sequencing through the edges is repeated until all the edges in edge list 115 have been processed according to the method steps set forth in FIG. 13A. For tetrahedron cell 10, that means that edges $e_1$ through $e_6$ are processed.

The result is that each edge of edge list 115 either (1) appears in deleted edge list 159, (2) appears in "keep edge" list 165, or (3) is modified, with the modified edge being stored in modified edge buffer 180.

FIG. 13B illustrates the further steps of the full mode polyhedron clipping method.

Face list 201 stores (1) each of the faces the polyhedron being cut and (2) a list of which edges share which faces. Face list 201 can be extracted in a conventional manner. A face list 201 for tetrahedron cell 10 is set forth in column A of FIG. 10.

Sequencer 204 sequences through face list 201 one face at a time. The method steps for the flow chart set forth in FIG. 13B are therefore for one face at a time.

Sequencer 204 first retrieves that data associated with the first face stored in face list 201 and stores that data in buffer 207. Thus, for a face $F_i$ of face list 201, sequencer 204 stores edges $e_{1i}$, $e_{2i}$, etc., which share face $F_i$. For tetrahedron 10, edges $e_1$, $e_2$, and $e_3$ are stored in buffer 207 for face $F_1$.

Each edge for face $F_i$ being processed is then sent to deleter 213. For example, edge $e_{1i}$ is sent to deleter 213.

Deleter 213 compares (1) the edge $e_{1i}$ sent to deleter 213 with (2) the edges in deleted edge list 210. Deleted edge list 210 contains a list of all the edges of the polyhedron that are to be deleted. If deleter finds edge $e_{1i}$ in delected edge list 210, then deleter 213 deletes edge $e_{1i}$—that is, deleter 213 does not send edge $e_{1i}$ to buffer 222.

If, however, deleter 213 does not find edge $e_{1i}$ in deleted edge list 210, then deleter 213 sends edge $e_{1i}$ to modifier 219.

If edge $e_{1i}$ is sent to modifier 219, then modifier 219 compares edge $e_{1i}$ with the edges listed in modified edge list 216 as being modified. In other words, modifier 219 looks to see what original edges are stored in modified edge list 216. Modified edge list 216 only stores an original edge if that edge has been modified.

If modifier 219 finds edge $e_{1i}$ in modified edge list 216, then modifier 219 (1) retrieves the modified edge $\bar{e}_{1i}$ in modified edge list 216 that corresponds to edge $e_{1i}$, (2) stores modified edge $\bar{e}_{1i}$ in buffer 222, and (3) does not store edge $e_{1i}$ in buffer 222.

If, however, modifier 219 does not find edge $e_{1i}$ in modified edge list 216, then modifier 219 places edge $e_{1i}$ in buffer 222.

It is to be appreciated that the edges on "keep edge" list 165 are neither deleted by deleter 213, nor replaced by modified edges by modifier 219. Rather, the edges on "keep edge" list 165 end up in buffer 222.

The above steps are repeated until all the edges for face $F_i$ have been inspected by deleter 213 or modifier 219, or both.

Edge generator 225 then looks at all the edges stored in buffer 222 for face $F_i$. If any of the original edges of face $F_i$ have been deleted or modified, that means that the edges stored in buffer 222 do not "close" face $F_i$. That would mean that face $F_i$ needs an edge. If that was the case, then edge generator 225 would generate a new edge $\bar{e}$ that would close the face $F_i$. In other words, the new edge generated by edge generator 225 would complete the chain of edges for face $F_i$.

If edge generator finds it necessary to generate a new edge $\bar{e}$, then that new edge $\bar{e}$ is placed in both buffer 231 and buffer 228.

All the other edges for face $F_i$ from buffer 222 are also placed in buffer 231.

If edge generator 225 generated a new edge $\bar{e}$ for face $F_i$, that means that face $F_i$ was cut by cutting surface. Because buffer 231 would contain the new edge $\bar{e}$, together with the edges from buffer 222, that means that buffer 231 would contain all the edges for a modified face $\bar{F}_i$ representing an a portion of face $F_i$ intersecting the cutting surface and to one side of the cutting surface.

If, however, buffer 222 contains all the original edges for face $F_i$, then edge generator 225 would not generate a new edge for face $F_i$. That would mean that face $F_i$ was not intersected by cutting surface P. All the original edges stored in buffer 222 would be placed in buffer 231. Buffer 231 would then contain all the original edges for unmodified face $F_i$.

As noted above, if edge generator does generate a new edge $\bar{e}$, then that new edge $\bar{e}$ is also placed in buffer 228.

The above steps are repeated for the next face from face list 201.

The above process is repeated until the sequencer 204 has retrieved all the faces from face list 201, and all the faces from face list 201 have been processed.

The result is that all the modified and unmodified faces of the polyhedron cell cut by the cutting surface are stored in buffer 231. Buffer 231 would not, however, store any entirely new face for the modified polyhedron cell. For tetrahedron cell 10 of FIG. 1, buffer 231 would contain original face $F_1$ as well as modified faces $\bar{F}_1$, $\bar{F}_4$, and $\bar{F}_3$.

In addition, all the edges of a new polygonal cut face are stored in buffer 228. This is so because anytime edge generator 225 generated a new edge, that new edge was placed in buffer 228. For tetrahedron 10 of FIG. 1, buffer 228 would contain new edges $e_{AB}$, $e_{BC}$, and $e_{CA}$ for new face $F_5$.

As the next step of the polyhedron clipper method, vertex and edge sorter and reviser 234 places in proper order the new face edges stored in buffer 228. The edges need to be sorted by sorter-reviser 234 so that they are properly chained together and point in the proper direction. All the edges for a particular face need to point in the same clockwise or counterclockwise direction. In addition, the order of the edges must be conform to the FEV right hand rule for faces, as discussed above.

Sorter/reviser 234 is necessary in order to form a new face from the new edges that can be combined with the modified and unmodified faces found in buffer 231.

For example, for the tetrahedron 10 of FIG. 1, if edges $e_{AC}$, $e_{CB}$, $e_{BA}$ appeared in buffer 228, then sorter/reviser would have to rearrange those edges in order to properly form edges $e_{AB}$, $e_{BC}$, $e_{CA}$.

The properly sorted and revised edges for the new face are stored in buffer 237.

Adder 240 adds the new face stored in buffer 237 to the modified and unmodified faces stored in buffer 231. The result from adder 240's addition is placed in buffer 243. Adder 240 thus places in buffer 243 the FEV topology of a modified polyhedron that represents a portion of the original polyhedron cell on the cutting surface and to one side of the cutting surface. Buffer 243 therefore contains the complete FEV topology for the modified cell that results from the full mode polyhedron clipping.

FIG. 14 illustrates the input and output data for cut-mode polyhedron clipper and interpolator 261. Data 81 for a complete bounded volume 82 is applied to pre-processing stage 83. Pre-processing stage 83 can decompose bounded volume 82 into smaller cellular polyhedra if necessary to achieve a more accurate cut-mode polyhedron clipping operation.

If bounded volume 82 is discomposed into smaller cells, then cut-mode polyhedron clipper and interpolator 261 processes each cell at a time. In other words, polyhedron clipper 261 processes a first cell, then a next cell, etc., until all the cells are clipped. The results are then assembled by post-processing stage 274, and displayed on display 54.

FEV topology data 85 for the polyhedron cell or bounded volume, as the case may be, is applied as an input to cut-mode polyhedron clipper and interpolator 261.

Coordinate data 87 and field data 89 are also applied as inputs to cut-mode polyhedron clipper 261. Data describing cutting surface 93 are also applied as an input cut-mode polyhedron clipper interpolator 261.

One of the outputs of cut-mode polyhedron clipper interpolator 261 is a set of new vertices 265 that define a cut face for the cell being clipped. The cut face defined by vertices 265 represents the intersection of cutting surface 93 with the cell being cut. For geometric cutting, the cut face can be a polygon. For cutting by an isosurface, the cut face or faces may or may not be planar.

New coordinate data 268 and new field data 261 are also outputted from cut-mode polyhedron clipper and interpolator 261.

New vertices 265 and new field data 271 is applied to post-processing stage 274. If cut-mode polyhedron clipper and interpolator 261 processes cellular polyhedra, then post-processing stage 274 can be used to assemble the new vertices data 265 to form a cut face for the entire bounded volume 82. Similarly, post-processing stage 274 can be used to assemble field data 271 for individual cells.

Post-processing stage 274 can be used for both straight cut and isosurface generation. The data output form the post-processing stage 274 can be displayed on display 54. The new coordinate data 268 can also be displayed on display 54.

FIGS. 15 and 16 illustrate the steps for performing a cut-mode polyhedron clipping operation. The cut-mode polyhedron clipping method can be used to save computation time, and in turn, to reduce costs.

Tetrahedron 10 being cut by cutting surface 20 is used as an example of one of the polyhedron cells being cut. It is to be appreciated, however, that other bounded volumes, including an eight-node brick or complex and irregular bounded volumes, can be clipped during a cut-mode polyhedron clipping operation. The result of a cut-mode polyhedron clipping operation is a computer model of a cut face representing an intersection of a cutting surface with a polyhedron.

FIG. 15 illustrates the input and output data for cut-mode polyhedron clipper edge visibility generator 285. The FEV topology data 85 for the cell or bounded volume to be clipped is applied to edge visibility generator 282. Edge visibility generator 282 outputs edge visibility list 285. Edge visibility 285 is a list of (1) all the edges of each polyhedron cell being clipped and (2) the edges that are visible to each of those edges. An edge is visible to another edge is the two edges share a common face.

The underlying reason for generating edge visibility list 285 is that if one edge is cut by the cutting surface, than at least one other edge visible to that edge is also cut by the cutting surface.

Visible edge list 285 is a visible edge list for tetrahedron cell 10 of FIG. 1. As can be seen from list 285, edges $e_2, e_3, e_4, e_5$ are visible to edge $e_1$ of tetrahedron 10.

The bar over certain edge symbols in edge visibility list 285 indicates that those edges are edges that are cut by cutting surface 20. The edges with the bars in edge visibility list 285 are thus edges modified by cutting surface 20.

FIG. 16 sets forth a method in hardware that illustrates the preferred cut-mode method of clipping a polyhedron cell to produce a cut face representing an intersection of a cutting surface with the polyhedron cell. The steps of the method of FIG. 16 are repeated for each of the cells of a bounded volume cut by a cutting surface.

The cutting surface for the cut-mode polyhedron clipping method of FIG. 16 can be an isosurface, or, alternatively, a geometric cutting plane.

As shown in FIG. 16, edge visibility list 285 is stored in edge visibility registers 301. Each row of the edge visibility registers 301 is designated as a row for a particular edge of the edges of the polyhedron. There is one row for each edge. All the edges of the polyhedron are set forth in the rows of edge visibility registers 301. The columns A through F of edge visibility registers 301 represent the edges visible to each of the edges set forth in the rows of edge visibility registers 301. Edge visibility registers 301 thus contain the visible edges for each edge, as governed by the edge visibility list.

If a visible edge has not been cut by the cutting surface, then the register of registers 301 for that unmodified edge contains the two vertices for that unmodified edge.

Edge cut flag registers 307 indicate whether or not each edge of the polyhedron has been cut by the cutting surface. A register of registers 307 contains a logical zero for an edge if that edge has not been cut by the cutting surface. An edge cut flag of edge cut flag registers 307 contains a logical one, however, if the edge associated with that flag has been cut by the cutting surface.

If an edge has been cut by a cutting surface, then a new modified vertex for the modified edge is calculated using an interpolation method like that of interpolation 174 of FIG. 13A. For geometric cutting, the new vertex represents a point, on the edge, intersecting the cutting plane. For cutting by an isosurface, the new vertex represents a point on the edge, wherein that point has field data associated with the point, and wherein that field data intersects the isosurface. For a modified edge, registers 307 store the modified vertex for the modified edge. If an edge has not been cut by the cutting surface, then no vertex is stored by registers 307 for that edge.

When the data for a visible edge stored in edge visibility register 307 is accessed, then an edge cut flag of registers 301 for that edge is reset to a logical zero and any new vertex data for that edge is outputted.

The cut-mode polyhedron clipping method of FIG. 16 is as follows. The method of FIG. 16 starts with any cut edge 333, as long as a record is kept that the particular modified edge was the first edge used in performing the steps of a cut-mode polyhedron clipping operation.

First cut edge 333, along with that edge's associated new vertex data, is applied to edge number requestor 327. Edge number requestor 327 sends a row select signal to row select circuitry 330 that indicates which of the edges corresponding to the row of registers 301 is to be selected. For example, if the first cut edge is edge $e_2$ of tetrahedron 10, then edge $e_2$ is applied to edge number register 327. Edge number register 327 then applies edge $e_2$ to row select circuitry 330. Row select circuitry 330 then selects the row of registers 301 associated with edge $e_2$.

When an edge number is placed an edge number requestor 327, edge number requestor 327 also resets sequencer 324 to column A.

Sequencer 324 steps through the columns of edge visibility registers 301, performing a column select function. Therefore, sequencer 324 is used to step through the visible edges for a particular edge.

After (1) edge number $e_2$ is sent to row select circuitry 330 and (2) sequencer 324 is reset, then the edge number of the edge stored in column A and the row for $e_2$ is accessed. For tetrahedron 10, edge $e_1$ is read.

Selector 304 then selects the edge cut flag for edge $e_1$ from edge cut flag registers 307. At step 321, the content of the edge cut flag for the particular edge is inspected to see if the edge has been cut by the cutting surface. After selector 304 selects an edge cut flag from registers 307, selector 304 resets that edge cut flag to a logical zero.

If the edge cut flag contains a zero, that means that the particular edge accessed has not been cut by the cutting surface. In that case, sequencer 324 is incremented so that it will access the next column of registers 301. The edge cut flag for edge $e_1$ contains zero, which indicates that the edge $e_1$ was not cut by the cutting surface 20. Therefore, sequencer 324 is incremented for tetrahedron cell 10.

Nevertheless, if comparison stage 321 indicates that an edge read from edge visibility registers 301 was cut by the cutting surface, then that edge number that is read is sent to edge number requestor 327. In addition, the new vertex data for that edge is also sent to edge number requester 327.

The new modified vertex for that cut or modified edge is then sent from edge register 327 to first in first out ("FIFO") stack 340 for storage.

When edge number requestor 327 receives an edge number of an edge that has been cut, edge number requestor 327 also sends a signal to register 343 to decrement a count.

The number of cut edges 347 for the polyhedron is supplied as an input to register 343.

Circuitry 349 inspects register 343 to see if the count stored in register 343 is equal to zero. If the count in register 343 equals zero, then the cut-mode polyhedron clipping steps are done.

Edge number requestor 327 also sends any new edge numbers it receives to row select circuitry 330. In addition, as discussed above, edge number requestor 327 also resets sequencer 324 whenever edge number requestor 327 receives a new edge number. Returning to tetrahedron 10, because $e_1$ was not a cut edge, sequencer 324 is incremented and accesses column B of edge visibility registers 301. Row select circuitry 330 remains at edge $e_2$, because no new edge number was loaded into edge number requestor 327.

Edge $e_3$ is thus read from edge visibility registers 301. Edge number $e_3$ is then applied to selector 304 and the edge cut flag for edge $e_3$ is selected from register 307. Inspection step 321 determines that a logical one is contained in the edge cut flag for register $e_3$. Therefore, register $e_3$ is sent to edge number requestor 327. The modified new vertex $\bar{v}_a$ of modified edge $e_3$ is then sent from the applicable register of registers 307 to FIFO stack 340.

Edge number requestor 327 sends edge $e_3$ to row selector circuitry 330. Edge number requestor 327 at the same time resets sequencer 324 back to column A.

The result is that edge $e_1$ is accessed from edge visibility registers 301. Selector 304 then checks the edge cug flag found in register 307 for edge $e_1$. Inspection circuitry 321 determines that there is a logical zero edge cut flag for edge $e_1$. Therefore sequencer 324 is incremented, and will then access column B for the row corresponding to edge $e_3$.

The above process continues until circuitry 349 determines that the count stored in register 343 is zero.

In an alternative embodiment of the present invention, the cut-mode of polyhedron clipping sequence is ended when the registers 307 are inspected and are found to be at logical zero.

In another alternative embodiment of the present invention, a marker is placed at the end of a row of registers 301. If the method steps reach the end of the row, that indicates that the polyhedron clipping method is finished.

After the cut-mode polyhedron clipping method steps are completed, the vertices stored in FIFO stack 340 are the vertices of a polygon that represents the intersection of cutting surface 20 with the polyhedron being cut. For geometric cutting of tetrahedron cell 10, the cut-mode polyhedron clipping method results in vertices $\bar{v}_a, \bar{v}_b, \bar{v}_c$ being stored in FIFO stack 340. Vertices $\bar{v}_a, \bar{v}_b, \bar{v}_c$ are the vertices for polygon cut face 12, which represents the intersection of cutting surface 20 with tetrahedron cell 10.

In a similar manner, the cut-mode polyhedron slicing method steps result in a new field data being stored in FIFO stack 340. The new field data is associated with the new vertices. The new field data can be stored in FIFO stack 340 for both geometric cutting and cutting by an isosurface. For geometric cutting of tetrahedron cell 10, the new field data would be associated with new vertices, $\bar{v}a, \bar{v}b, \bar{v}c$.

FIG. 17 illustrates that configuration for the full mode of polyhedron clipping 91 for front a cut operation. Data 403 is applied to CPU 407, which generates polyhedron 410. Full mode polyhedron clipper 91 clips polyhedron 410 according to cutting surface 93. The resultant polyhedron 422 is then sent to raster converter/Z buffer 425 as polygons 413 by sending one face at a time. Frame buffer 416 holds the polygons, and the final image is displayed on display 419.

FIG. 18 illustrates a configuration for a full mode polyhedron clipper 91 for doing multiple cuts. The multiple cuts can be either by simultaneous cuts by several cutting surfaces 451 or by sequential cuts of a single cutting surface. Polyhedrons 460 are applied to a full mode polyhedron clipper 91. Polyhedrons 463 result. An output of full mode polyhedron clipper 91 is re-applied to full mode clipper 91.

The configuration of FIG. 18 also can do an arbitrary cut.

FIG. 19 illustrates a configuration using cut-mode polyhedron clipper 261 in conjunction with polygon clipper 523. The configuration of FIG. 19 is useful for one-cut operations involving static topology because the configuration generally results in reduced computational time as compared with a full mode polyhedron slicing operation. The result of the configuration of FIG. 19 is just the outer surface of the modified polyhedron that represents the intersection of that half-space and the polyhedron to be cut.

The data 503 for the polyhedron to be cut is applied to CPU 407. CPU 407 sends data to outer surface sorter 527. CPU 407 also generates a full FEV 506 of the polyhedron.

The outer surface extractor means 527 of FIG. 19 uses a hybridization of the traditional polygon-search/-cancel ("PSC") algorithm and the more recent assembled-surface-normal ("ASN") method.

The PSC algorithm is used as a first pass to determine the exterior nodes and faces. It has the advantage of being of strictly topological basis and is thus independent of geometry associated floating-point tolerancing. In fact, the exterior face list may be computed based only on element data without any knowledge of the nodal coordinates. An additional advantage of the PSC over the ASN algorithm is the correct processing of single-element-thick-layers.

A common complaint associated with the PSC algorithm is its computational costs. Direct implementations typically use a linear search thus resulting in $O(N^2)$ complexity wherein N is the number of faces to be processed. By instead using a hash table lookup with chaining to resolve collisions, the complexity may be reduced to $O(N)$. The resulting algorithm is fast, yet more accurate than ASN.

The ASN algorithm does, however, play an important role. It provides the necessary geometric information for visible edge detection. A visible edge is defined as one at which the surface normal changes significantly across the edge. Visible edges may be used to enhance the viewing of an object in smooth color-fringe display, particularly when transparent surfaces are used.

In this second face of the exterior analysis, the ASN algorithm is applied to those nodes and faces in the exterior face list. Having generated the ASN, a second pass is then made through the exterior face list comparing the normal of the face at each vertex to the corresponding ASN. If a significant difference is found, then the surface is discontinuous at this point, and the corresponding node is marked as an edge node. Finally, the exterior faces are processed one last time and an exterior edge list is generated, wherein edges for which both nodes are marked as edge nodes.

Culling step 509 is a test to see if cutting surface 93 actually cuts a polyhedron anywhere. Culling step 509 involves checking the signed distances to see if they are of opposite sign. Culling step 509 can reduce computation time because it avoids further computation if the cutting surface 93 is not cutting the polyhedron.

Polygonal cut face 512 is the output of cut-mode polyhedron clipper 261.

The output of polygon clipper 523 is a partial outer surface 526 of the polyhedron. The partial outer surface 526 does not, however, include the cut face. Therefore, adder 515 adds cut face 512 to the partial outer surface 526 to produce outer surface 529 of the entire polyhedron.

FIG. 20 illustrates a configuration for cut mode polyhedron clipper 261 for doing area analysis.

Data 603 for the polyhedron to be clipped is sent to CPU 407. CPU 407 in term produces a full FEV 609 of the polyhedron. The full FEV 609 is applied to the cut mode polyhedron clipper 261. Cutting surface 93 is also sent to the cut mode polyhedron 261.

The output of cut mode polyhedron clipper 261 is a cut face polygon 612. Integrator 615 then integrates according to user function 625. That allows the calculation of various desired quantities, including area, moments of inertia, and other engineering and mathematical quantities.

Area integral 619 is the integral for area. In conjunction with the user function 625, one can also calculate the moment of intertia.

Sequencer 622 can step through different cutting planes 93. The resulting areas can be summed by summer 636, and the data sent to volume integral 633. Thus, the volume of a bounded volume can be calculated.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A method for forming a computer model of a modified bounded volume representing a portion of a bounded volume on a cutting surface and to a first side of the cutting surface, wherein the bounded volume is comprised of a plurality of faces, edges, and vertices, comprising the steps of:

(a) calculating a first signed distance between (1) a first vertex on a first edge of a first face of the bounded volume and (2) the cutting surface, wherein the first signed distance is positive if the first vertex does not reside on the cutting surface and does not reside on the first side of the cutting surface, wherein the first signed distance is negative if the first vertex resides on the first side of the cutting surface, and wherein the first signed distance is zero if the first vertex resides on the cutting surface;

(b) calculating a second signed distance between (1) a second vertex on the first edge of the first face of the bounded volume and (2) the cutting surface, wherein the second signed distance is positive if the second vertex does not reside on the cutting surface and does not reside on the first side of the cutting surface, wherein the second signed distance is negative if the second vertex resides on the first side of the cutting surface, and wherein the second signed distance is zero if the second vertex resides on the cutting surface;

(c) if both the first signed distance and the second signed distance are positive, then modifying the first face by deleting the first edge from the first face;

(d) if both the first signed distance and the second signed distance are negative, then retaining the first edge on the first face;

(e) if both the first signed distance and the second signed distance are zero, then retaining the first edge on the first face;

(f) if the first signed distance is of a different sign that the second signed distance, then modifying the first face by modifying the first edge of the first face by interpolation;

(g) if one and only one of the first and second signed distances is zero, then:

(i) modifying the first face by deleting the first edge from the first face if the first signed distance is zero and the second signed distance is positive:

(ii) modifying the first face by retaining the first edge on the first face if the first signed distance is zero and the second signed distance is negative:

(iii) modifying the first face by deleting the first edge from the first face if the second signed distance is zero and the first signed distance is positive:

(iv) modifying the first face by retaining the first edge on the first face if the second signed distance is zero and the first signed distance is negative:

(h) repeating steps (a) through (g) for each of the remaining edges of the first face, wherein each next edge of the remaining edges becomes the first edge upon each repetition of steps (a) through (g);

(i) if the first face has been modified and is missing an edge, then:

(1) generating a first cut-face edge for the first face;

(2) storing the first cut-face edge; and (3) modifying the first face by adding the first cut-face edge to the first face;

(j) if the first face has been modified, then storing the first face as modified;

(k) if the first face has not been modified, then storing the unmodified first face;

(l) repeating steps (a) through (k) for each of the remaining faces of the bounded volume, wherein upon each repetition of steps (a) through (k), (1) each next face of the remaining faces becomes the first face and (2) each next cut-face edge becomes the first cut-face edge;

(m) forming a cut face from the stored cut-face edges;

(n) adding the cut face to the stored faces of the bounded volume to form the modified bounded volume.

2. The method of claim 1 for forming a computer model of a modified bounded volume, wherein the cutting surface is a cutting plane.

3. The method of claim 2 for forming a computer model of a modified bounded volume, wherein the first signed distance is calculated by taking a vector dot product $(V_1-R)\cdot N$, which is equal to the first signed distance, wherein $V_1$ is a vector from an origin to the first vertex on the first edge of the first face of the bounded volume, wherein R is a vector from the origin to a point on the cutting plane, and wherein N is a vector that is normal to the cutting plane, and the second signed distance is calculated by taking the vector dot product $(V_2-R)\cdot N$, which is equal to the second signed distance, wherein $V_2$ is a vector from the origin to the second vertex on the first edge of the first face of the bounded volume, wherein R is the vector from the origin to the point on the cutting plane, and wherein N is the vector that is normal to the cutting plane.

4. The method of claim 1 for forming a computer model of a modified bounded volume, wherein the bounded volume is a convex planar-faced straight-edged polyhedron.

5. The method of claim for 1 for forming a computer model of a modified bounded volume, wherein the modification of the first edge of the first face by interpolation is governed by the equation $\bar{v}=a_1v_1+a_2v_2$, wherein $\bar{e}_1$ equals $(v_1\bar{v})$ if $d_1$ is less than zero and $d_2$ is greater than or equal to zero, wherein $\bar{e}_1$ equals $(\bar{v}, v_2)$ if $d_2$ is less than zero and $d_1$ is greater than or equal to zero, wherein $\bar{e}_1$ is the modified first edge, wherein $d_1$ is the first signed distance, wherein $d_2$ is the second signed distance, wherein $v_1$ is the first vertex of first edge of the first face of the bounded volume, wherein $v_2$ is the second vertex of the first edge of the first face of the bounded volume, wherein is a modified vertex, wherein $a_1$, equals $|d_2|/(|d_1|+|d_2|)$, wherein $a_2$ equals $|d_1|/(|d_1|+|d_2|)$, wherein $|d_1|$ is the absolute value of the first signed distance, and wherein $|d_2|$ is the absolute value of the second signed distance.

6. The method of claim 1 for forming a computer model of a modified bounded volume, wherein the step of forming the cut-face from the stored cut-face edges includes the steps of:

sorting the stored cut-face edges so that the stored cut-face edges can be chained together in a direction; and reversing the direction of the stored cut-face edges so that the stored cut-face edges point in a direction that allows the cut-face to be added to the stored faces of the bounded volume.

7. The method of claim 1 for forming a computer model of a modified bounded volume, wherein step (f) further includes a step of modifying by interpolation field data associated with the first edge of the first face of the bounded volume, wherein the field data comprises data representing a physical characteristic.

8. The method of claim 7 for forming a computer model of modified bounded volume, wherein the modification of the field data by interpolation is governed by the equation $\bar{\phi}=a_1\phi_1+a_2\phi_2$, wherein $(\phi_1, \phi)$ becomes associated with $\bar{e}_1$ if $d_1$ is less than zero and $d_2$ is greater than or equal to zero, wherein $(\bar{\phi}, \phi_2)$ becomes associated with $\bar{e}_1$ if $d_2$ is less than zero and $d_1$ is greater than or equal to zero, wherein $\bar{e}_1$ is the modified first edge, wherein $d_1$ is the first signed distance, wherein $d_2$ is the second signed distance, wherein $\phi_1$ is a first field datum associated with the first vertex of the first edge of the first face of the bounded volume, wherein $\phi_2$ is a second field datum associated with the second vertex of the first edge of the first face of the bounded volume, wherein $\bar{\phi}$ is a modified field datum, wherein $a_1$ equals $|d_2|/(|d_1|+d_2|)$, wherein $a_2$ equals $|d_1|/(|d_1|+|d_2|)$, wherein $|d_1|$ is the absolute value of the first signed distance, and wherein $|d_2|$ is the absolute value of the second signed distance.

9. The method of claim 7 for forming a computer model of a modified bounded volume, wherein the field data comprises color data and the physical characteristic comprises color.

10. The method of claim 7 for forming a computer model of a modified bounded volume, wherein the field data comprises stress data and the physical characteristic comprises stress.

11. The method at claim 7 for forming a computer model of a modified bounded volume, wherein the field data comprises temperature data and the physical characteristic comprises temperature.

12. The method of claim 7 for forming a computer model of a modified bounded volume, wherein the field data comprises pressure data and the physical characteristic comprises pressure.

13. The method of claim 1 for forming a computer model of a modified bounded volume, wherein the cutting surface is an isosurface.

14. A method for forming a computer model of a cut face representing an intersection of a cutting surface with a bounded volume comprised of a plurality of faces, edges, and vertices, comprising the steps of:
  (a) generating an edge visibility list for each of the edges of the bounded volume, wherein an edge is visible to another edge if the two edges share a common face;
  (b) calculating a first signed distance between (1) a first vertex on a first edge of the bounded volume and (2) the cutting surface, wherein the first signed distance is positive if the first vertex does not reside on the cutting surface and does not reside on a first side of the cutting surface, wherein the first signed distance is negative if the first vertex resides on the first side of the cutting surface, and wherein the first signed distance is zero if the first vertex resides on the cutting surface;
  (c) calculating a second signed distance between (1) a second vertex on the first edge of the bounded volume and (2) the cutting surface, wherein the second signed distance is positive if the second vertex does not reside on the cutting surface and does not reside on the first side of the cutting surface, wherein the second signed distance is negative if the second vertex resides on the first side of the cutting surface, and wherein the second signed distance is zero if the second vertex resides on the cutting surface;
  (d) if the first signed distance is of a different sign than the second signed distance, then:
    (1) modifying one of the first and second vertices of the first edge by interpolation;
    (2) storing the modified vertex of the first edge of the bounded volume, and
    (3) setting an edge-cut flag to indicate that the first edge of the bounded volume has been cut by the cutting surface;
  (e) repeating steps (b) through (d) for each of the remaining edges of the bounded volume, wherein each next edge of the remaining edges of the bounded volume becomes the first edge upon each repetition of steps (b) through (d);
  (f) if any of the edges of the bounded volume have been cut, then:
    (1) stepping sequentially through the edge visibility list from the beginning of the edge visibility list for one of the cut edges until reaching an entry for a cut edge in the edge visibility list, as indicated by the edge-cut flag for the cut edge reached in the edge visibility list;
    (2) storing the modified vertex of the cut edge reached in the edge visibility list;
    (3) repeating steps (1) and (2) immediately above for each of the remaining cut edges of the bounded volume, wherein the cut edge reached in the edge visibility list becomes the one of the cut edges upon each repetition of steps (1) and (2); and
    (4) forming the cut face from the stored modified vertices of the cut edges of the bounded volume.

15. The method of claim 14 for forming a computer model of a cut-face, wherein the cutting surface is a cutting plane.

16. The method of claim 15 for forming a computer model of a cut-face, wherein
  the first signed distance is calculated by taking a vector dot product $(V_1-R) \cdot N$, which is equal to the first signed distance, wherein $V_1$ is a vector from an origin to the first vertex on the first edge of the bounded volume, wherein R is a vector from the orgin to a point on the cutting plane, and wherein N is a vector that is normal to the cutting plane; and
  the second signed distance is calculated by taking the vector dot product $(V_2-R) \cdot N$, which is equal to the second signed distance, wherein $V_2$ is a vector from the origin to the second vertex on the first edge of the bounded volume, wherein R is the vector from the origin to the point on the cutting plane, and wherein N is the vector that is normal to the cutting plane.

17. The method of claim 14 for forming a computer model of a cut-face, wherein the bounded volume is a convex planar-faced straight-edged polyhedron.

18. The method of claim 14 for forming a computer model of a cut-face, wherein the modification of one of the first and second vertices of the first edge of the bounded volume by interpolation is governed by the equation $\bar{v}=a_1 v_1+a_2 v_2$, wherein $\bar{v}$ is the modified vertex, wherein the second vertex is made equal to $\bar{v}$ if $d_1$ is less than zero and $d_2$ is greater than or equal to zero, wherein the first vertex is made equal to $\bar{v}$ if $d_2$ is less than zero and $d_1$ is greater than or equal to zero, wherein $d_1$ is the first signed distance, wherein $d_2$ is the second signed distance, wherein $a_1$ equals $|d_2|/(|d_2|+|d_2|)$, wherein $a_2$ equals $|d_1|/(|d_1|+|d_2|)$, wherein $|d_1|$ is the absolute value of the first signed distance, and wherein $|d_2|$ is the absolute value of the second signed distance.

19. The method of claim 14 for forming a computer model of a cut face, wherein the step (d) further comprises a step of modifying by a second interpolation one of a first and second field data if the first signed distance is of a different sign than the second signed distance, wherein the first and second field data each comprises data representing a physical characteristic, wherein the first field datum is associated with the first vertex of the first edge of the bounded volume, wherein the second field datum is associated with the second vertex of the first edge of the bounded volume.

20. The method of claim 19 for forming a computer model of a cut-face, wherein the modification of one of the first and second field data by the second interpolation is governed by the equation $\bar{\phi}=a_1\phi_1+a_2\phi_2$, wherein $\bar{\phi}$ is a modified field datum, wherein the second field datum is made equal to $\bar{\phi}$ if $d_1$ is less than zero and $d_2$ is greater than or equal to zero, wherein the first field datum is made equal to $\bar{\phi}$ if $d_2$ is less than zero and $d_1$ is greater than or equal to zero, wherein $d_1$ is the first signed distance, wherein $d_2$ is the second signed distance, wherein $a_1$ equals $|d_2|/(|d_1|+|d_2|)$, wherein $a_2$ equals $|d_1|/(|d_1|+|d_2|)$, wherein $|d_1|$ is the absolute value of the first signed distance, and wherein $|d_2|$ is the absolute value of the second signed distance.

21. The method of claim 19 for forming a computer model of a cut face, wherein the field data comprises color data and the physical character comprises color.

22. The method of claim 19 for forming a computer model of a cut face, wherein the field data comprises stress data and the physical characteristic comprises stress.

23. The method of claim 19 for forming a computer model of a cut face, wherein the field data comprises temperature data and the physical characteristic comprises temperature.

24. The method of claim 19 for forming a computer model of a cut face, wherein the field data comprises pressure data and the physical characteristic comprises pressure.

25. The method of claim 9 for forming a computer model of a cut-face, wherein the cutting surface is an isosurface.

26. A method of forming a computer model of a modified bounded volume representing an intersection of a half-space with a bounded volume, wherein the half-space is comprised of points on a cutting surface and to one side of a cutting surface, comprising the steps of:

(a) decomposing the bounded volume into a plurality of cells, wherein each cell comprises a polyhedron;

(b) calculating a first signed distance between (1) a first vertex on a first edge of a first face of the a first cell of the plurality of cells and (2) the cutting surface, wherein the first signed distance is positive if the first vertex resides outside the half-space, wherein the first signed distance is negative if the first vertex resides inside the half-space, and wherein the first signed distance is zero if the first vertex resides on the cutting surface;

(c) calculating a second signed distance between (1) a second vertex on the first edge of the first face of the first cell and (2) the cutting surface, wherein the second signed distance is positive if the second vertex resides outside the half-space, wherein the second signed distance is negative if the second vertex resides inside the half-space, and wherein the second signed distance is zero if the second vertex resides on the cutting surface;

(d) if both the first signed distance and the second signed distance are positive, then modifying the first face by deleting the first edge from the first face;

(e) if both the first signed distance and the second signed distance are negative, then retaining the first edge on the first face;

(f) if both the first signed distance and the second signed distance are zero, then retaining the first edge on the first face;

(g) if the first signed distance is of a different sign than the second signed distance, then modifying the first face by modifying the first edge of the first face by interpolation;

(h) if one and only one of the first and second signed distances is zero, then:

(i) modifying the first face by deleting the first edge from the first face if the first signed distance is zero and the second signed distance is positive;

(ii) modifying the first face by retaining the first edge on the first face if the first signed distance is zero and the second signed distance is negative;

(iii) modifying the first face by deleting the first edge from the first face if the second signed distance is zero and the first signed distance is positive;

(iv) modifying the first face by retaining the first edge on the first face if the second signed distance is zero and the first signed distance is negative;

(i) repeating steps (b) through (h) for each of the remaining edges of the first face, wherein each next edge of the remaining edges becomes the first edge upon each repetition of steps (b) through (h);

(j) if the first face has been modified and is missing an edge, then:

(1) generating a first cut-face edge for the first face;
(2) storing the first cut-face edge; and
(3) modifying the first face by adding the first cut-face edge to the first face;

(k) if the first face has been modified, then storing the first face as modified;

(l) if the first face has not been modified, then storing the unmodified first face;

(m) repeating steps (b) through (l) for each of the remaining faces of the first cell, wherein upon each repetition of steps (b) through (l), (1) each next face of the remaining faces becomes the first face and (2) each next cut-face edge becomes the first cut-face edge;

(n) forming a cut face from the stored cut-face edges;

(o) adding the cut face to the stored faces of the first cell to form a modified first cell, wherein the modified first cell represents the intersection of the half-space with the first cell; and (p) repeating steps (b) through (o) for each of the remaining cells of the bounded volume, wherein upon each repetition of steps (b) through (o), each next cell of the remaining cells becomes the first cell.

27. The method of claim 26 for forming a computer model of a modified bounded volume, wherein the cutting surface is a cutting plane.

28. A method for forming a computer model of a cut face representing an intersection of a cutting surface with a bounded volume comprised of a plurality of faces, edges, and vertices, comprising the steps of:

(a) decomposing the bounded volume into a plurality of cells, wherein each cell comprises a polyhedron;

(b) generating an edge visibility list for each of the edges of the plurality of cells, wherein an edge is visible to another edge if the two edges share a common face;

(c) calculating a first signed distance between (1) a first vertex on a first edge of a first cell of the plurality of cells and (2) the cutting surface, wherein the first signed distance is positive if the first vertex resides off the cutting surface at a first side of the cutting surface, wherein the first signed distance is negative if the first vertex resides off the cutting surface at a second side of the cutting surface, wherein the second side is opposite to the first side, and wherein the first signed distance is zero if the first vertex resides on the cutting surface;

(d) calculating a second signed distance between (1) a second vertex on the first edge of the first cell and (2) the cutting surface, wherein the second signed distance is positive if the second vertex resides off the cutting surface at the first side of the cutting surface, wherein the second signed distance is negative if the second vertex resides off the cutting surface at the second side of the cutting surface, and wherein the second signed distance is zero if the second vertex resides on the cutting surface;

(e) if the first signed distance is of a different sign than the second signed distance, then:
   (1) modifying one of the first and second vertices of the first edge by interpolation;
   (2) storing the modified vertex of the first edge of the solid, and
   (3) setting an edge-cut flag to indicate that the first edge of the first cell has been cut by the cutting surface;

(f) repeating steps (c) through (e) for each of the remaining edges of the first cell, wherein each next edge of the remaining edges of the solid becomes the first edge upon each repetition of steps (b) through (d);

(g) if any of the edges of the first cell have been cut, then:
   (1) stepping sequentially through the edge visibility list from the beginning of the edge visibility list for one of the cut edges until reaching an entry for a cut edge in the edge visibility list, as indicated by the edge-cut flag for the cut edge reached in the edge visibility list;
   (2) storing the modified vertex of the cut edge reached in the edge visibility list;
   (3) repeating steps (1) and (2) immediately above for each of the remaining cut edges of the first cell, wherein the cut edge reached in the edge visibility list becomes the one of the cut edges upon each repetition of steps (1) and (2); and
   (4) forming a cut face for the first cell from the stored modified vertices of the cut edges of the first cell;

(h) repeating steps (c) through (g) for each of the remaining cells of the bounded volume, wherein upon each repetition of steps (c) through (g), each next cell of the remaining cells becomes the first cell.

29. The method of claim 28 for a computer model of a cut face, wherein the cutting surface is an isosurface.

* * * * *